(12) United States Patent
Bhagavatula et al.

(10) Patent No.: US 9,609,457 B2
(45) Date of Patent: Mar. 28, 2017

(54) MOBILE APPLICATION PROCUREMENT AND CONFIGURATION OPTIONS FOR VOIP SERVICE

(75) Inventors: Satish Bhagavatula, Chandler, AZ (US); Manish Rao, Phoenix, AZ (US)

(73) Assignee: CREXENDO, INC., Tempe, AZ (US)

( * ) Notice: Subject to any disclaimer, the term of this patent is extended or adjusted under 35 U.S.C. 154(b) by 248 days.

(21) Appl. No.: 13/560,784

(22) Filed: Jul. 27, 2012

(65) Prior Publication Data

US 2014/0029475 A1    Jan. 30, 2014

(51) Int. Cl.

| | |
|---|---|
| *H04L 12/16* | (2006.01) |
| *H04M 3/42* | (2006.01) |
| *H04W 4/00* | (2009.01) |
| *H04L 29/06* | (2006.01) |
| *H04L 12/24* | (2006.01) |
| *H04M 7/00* | (2006.01) |

(52) U.S. Cl.
CPC ......... *H04W 4/001* (2013.01); *H04L 41/0806* (2013.01); *H04L 65/1069* (2013.01); *H04M 7/006* (2013.01)

(58) Field of Classification Search
CPC ...... H04L 12/16; H04L 65/1013; H04W 4/16; H04M 1/2473; H04M 7/006
USPC ........ 370/259, 271, 352; 379/212.01, 212.02
See application file for complete search history.

(56) References Cited

U.S. PATENT DOCUMENTS

| | | | |
|---|---|---|---|
| 9,043,870 B1 * | 5/2015 | Barenholz | H04L 63/0815 726/2 |
| 2004/0066916 A1 | 4/2004 | Brown et al. | |
| 2005/0073964 A1 * | 4/2005 | Schmidt et al. | 370/260 |
| 2005/0152515 A1 | 7/2005 | Amir et al. | |
| 2005/0243809 A1 * | 11/2005 | Best et al. | 370/356 |
| 2006/0034266 A1 | 2/2006 | Harris et al. | |
| 2006/0227957 A1 | 10/2006 | Dolan et al. | |
| 2007/0220275 A1 * | 9/2007 | Heitzeberg et al. | 713/186 |
| 2008/0069327 A1 * | 3/2008 | Kingsley et al. | 379/201.03 |
| 2009/0220064 A1 * | 9/2009 | Gorti et al. | 379/202.01 |
| 2009/0286514 A1 | 11/2009 | Lichorwic et al. | |
| 2009/0305683 A1 | 12/2009 | Gupta et al. | |
| 2010/0254370 A1 | 10/2010 | Jana et al. | |
| 2010/0254375 A1 * | 10/2010 | Feuerhahn et al. | 370/352 |
| 2010/0279675 A1 * | 11/2010 | Slack et al. | 455/419 |
| 2011/0022968 A1 * | 1/2011 | Conner et al. | 715/753 |
| 2011/0026701 A1 | 2/2011 | Kirchhoff et al. | |
| 2011/0182283 A1 * | 7/2011 | Van Buren et al. | 370/352 |
| 2011/0271209 A1 * | 11/2011 | Jones et al. | 715/753 |
| 2012/0166545 A1 | 6/2012 | Alexandrov et al. | |
| 2012/0264427 A1 * | 10/2012 | Adatia et al. | 455/435.1 |

(Continued)

OTHER PUBLICATIONS

U.S. Appl. No. 13/560,776, Final Office Action dated Feb. 10, 2015 (26 pages).

(Continued)

*Primary Examiner* — Man Phan
*Assistant Examiner* — Ryan Kavleski
(74) *Attorney, Agent, or Firm* — Conley Rose, P.C.

(57) ABSTRACT

In at least some embodiments, a system includes at least one server to manage voice over internet protocol (VOIP) services. The managed VOIP services provided by the at least one server include a procurement service configured to streamline configuration of at least some of the VOIP services for a mobile device during a signup session based on a VOIP services signup session token.

34 Claims, 18 Drawing Sheets

(56) References Cited

U.S. PATENT DOCUMENTS

2012/0327812 A1  12/2012  Xiao et al.
2013/0086650 A1* 4/2013  Soundrapandian et al. ...... 726/5
2013/0262594 A1  10/2013  Bastide et al.

OTHER PUBLICATIONS

U.S. Appl. No. 13/560,765, Response to Office Action dated Jun. 30, 2014, filed Oct. 30, 2014 (14 pages).
U.S. Appl. No. 13/560,776, Response to Office Action dated Jul. 18, 2014, filed Oct. 20, 2014 (14 pages).
U.S. Appl. No. 13/560,765, Office Action dated Jun. 30, 2014.
U.S. Appl. No. 13/560,776, Office Action dated Jul. 18, 2014.
U.S. Appl. No. 13/560,776, Office Action dated Sep. 30, 2015 (26 pages).
U.S. Appl. No. 13/560,765, Response to Final Office Action dated Mar. 3, 2015, filed May 4, 2015 (15 pages).
U.S. Appl. No. 13/560,776, Response to Final Office Action dated Feb. 10, 2015, filed May 11, 2015 (15 pages).
U.S. Appl. No. 13/560,765, Advisory Action dated May 21, 2015 (6 pages).
U.S. Appl. No. 13/560,765, Request for Continued Examination and Preliminary Amendment in Response to Final Office Action of Mar. 3, 2015, filed Jun. 16, 2015 (19 pages).
U.S. Appl. No. 13/560,765, Final Office Action dated Mar. 3, 2015 (19 pages).
U.S. Appl. No. 13/560,765, Office Action dated Dec. 15, 2015 (23 pages).
U.S. Appl. No. 13/560,776, Response to Office Action dated Sep. 30, 2015, filed Dec. 29, 2015 (13 pages).
U.S. Appl. No. 13/560,765, Response to Office Action dated Dec. 15, 2015 filed Mar. 15, 2016 (14 pages).

* cited by examiner

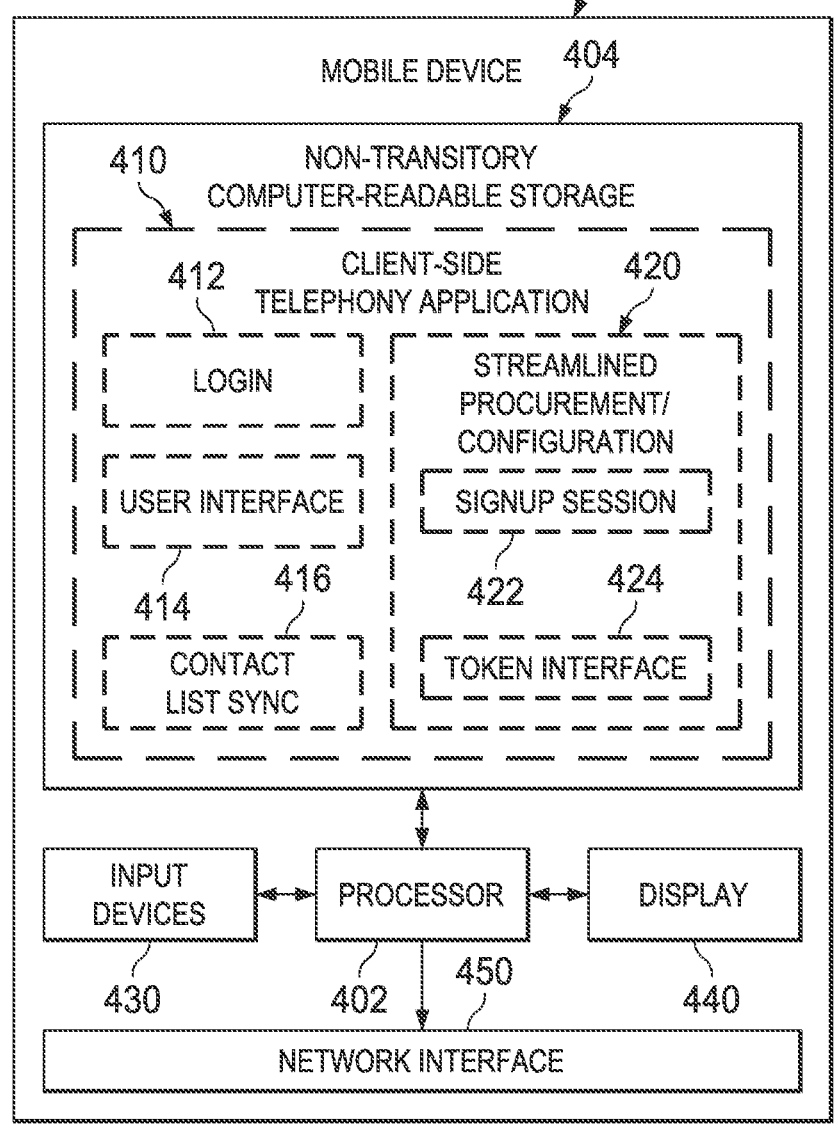

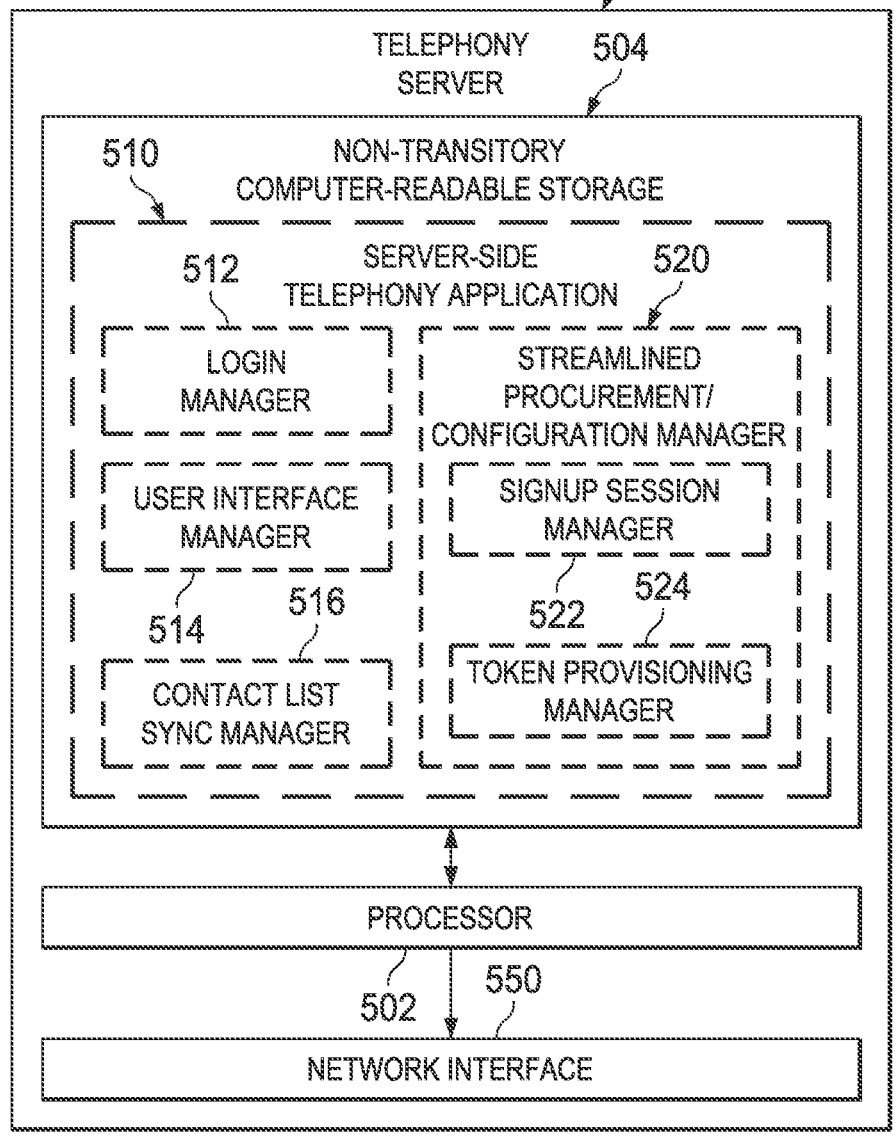

MOBILE APPLICATION PROCUREMENT AND CONFIGURATION OPTIONS FOR VOIP SERVICE

BACKGROUND

The ongoing proliferation of wireless smart phones or other mobile devices has provided both public and private users with an unprecedented variety of functions that have extended the reach of dozens of voice and data applications to the palm of the hand. Many of these capabilities, provided by downloadable software applications, enable users of mobile devices with a wide range of specialized functions. Just as in the case of a desktop computer, mobile devices now support a large number of concurrent processes that can be installed to run in the background or on an as-needed basis. The choice of what and when is up to the user.

One useful feature of mobile devices in a business environment is taking office calls while traveling. While many private branch exchange (PBX) systems offer telephone services, what is needed is an effective and novel solution that allows mobile users to quickly set up and benefit from voice over IP (VOIP) service options.

BRIEF DESCRIPTION OF THE DRAWINGS

For a detailed description of exemplary embodiments of the invention, reference will now be made to the accompanying drawings in which:

FIG. 4 shows a mobile device in accordance with an embodiment of the disclosure;

FIG. 5 shows a telephony server in accordance with an embodiment of the disclosure;

NOTATION AND NOMENCLATURE

Figure 1:
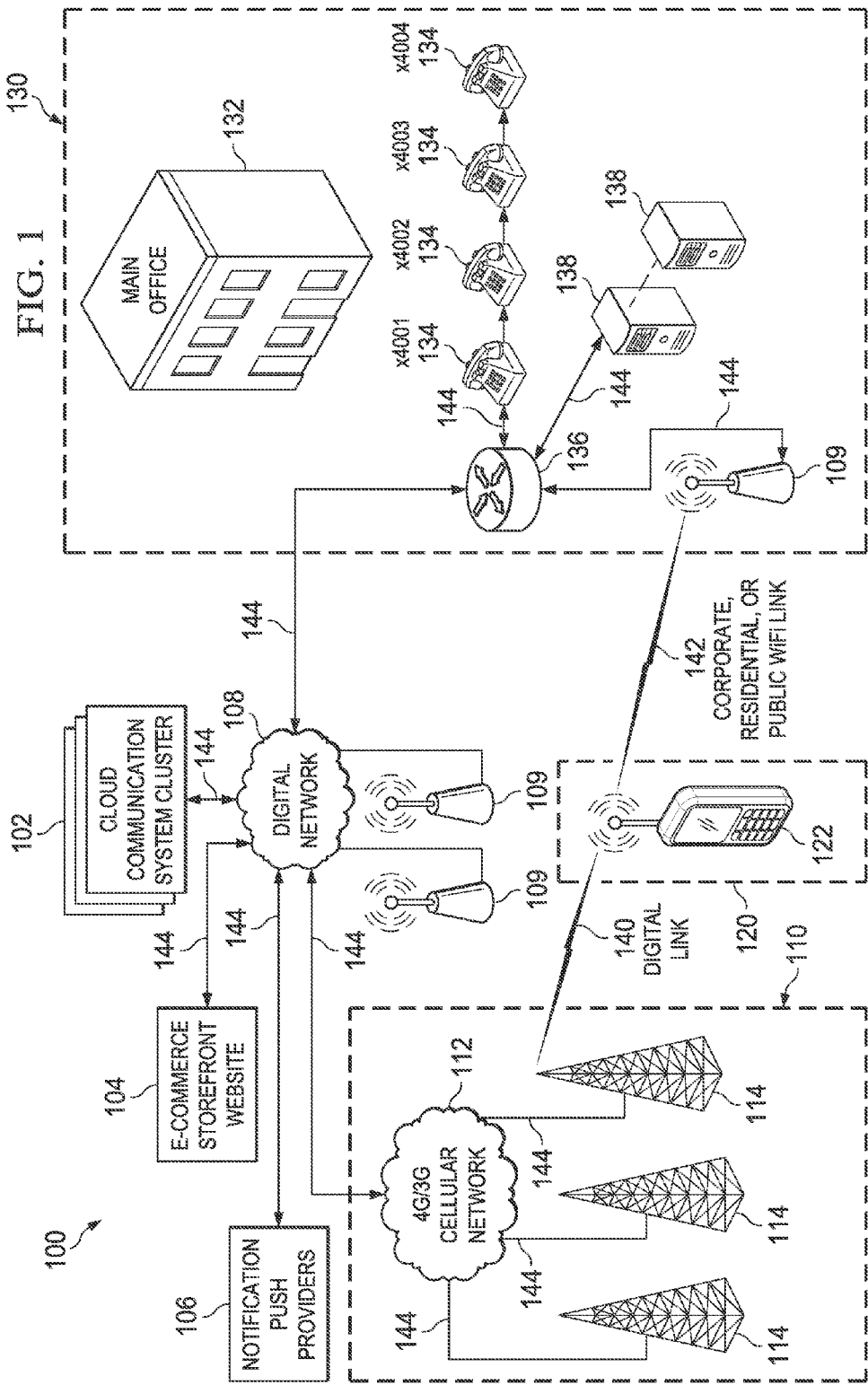
FIG. 1 shows a block diagram of a network environment in accordance with an embodiment of the disclosure.

Certain terms are used throughout the following description and claims to refer to particular system components. As one skilled in the art will appreciate, individuals and organizations may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to methods and systems to procure and configure options for cloud-based VOIP services extended to mobile devices. While various examples of procuring and configuring options for cloud-based VOIP services are provided, the examples disclosed should not be interpreted, or otherwise used, as limiting the scope of the disclosure, including the claims. In addition, one skilled in the art will understand that the following description has broad application, and the discussion of any particular example is not intended to intimate that the scope of the disclosure, including the claims, is limited to that example.

The procurement and configuration options for a VOIP service as described herein are based on server-side VOIP operations and client-side VOIP operations, where at least some of the clients correspond to mobile devices. Each such mobile device may perform client-side VOIP operations, including the procurement and configuration features disclosed herein, by executing a telephony application (T-App). In at least some embodiments, the VOIP service is provided for an enterprise or group of users. Such users may be members of an enterprise or other organization that subscribes to commercially selected and procured communication features associated with a VOIP service. As such, a contact list or calendar corresponding to the enterprise or organization may be utilized in conjunction with the streamlined conferencing features of the VOIP server.

In some embodiments, the server-side VOIP operations for streamlined procurement and configuration may include various steps including, but not limited to, initiating a signup session for VOIP services on a mobile device, and streamlining configuration of at least some of the VOIP services for the mobile device during the signup session based on a VOIP services signup session token. The step of streamlining configuration of VOIP services based on a VOIP services signup session token may correspond configuring one-touch call transfer options, streamlined conferencing options, contact list options, or other VOIP service options. Further, the step of streamlining configuration of VOIP services based on a VOIP services signup session token may correspond to streamlined entry of signup data for a user of the mobile device, where the signup data comprises information such as a phone number, a name, an address, an email, and a password. Further, the step of streamlining configuration of VOIP services based on a VOIP services signup session token may correspond to streamlined entry of billing information for a user of the mobile device. Further, the step of streamlining configuration of VOIP services based on a VOIP services signup session token may correspond to streamlined entry of session initiation protocol (SIP) settings for the mobile device. Further, the step of streamlining configuration of VOIP services based on a VOIP services signup session token may correspond to streamlined entry of enterprise information associated with a user of the mobile device.

In at least some embodiments, the server-side VOIP operations also include providing a printable image (e.g., a coded image or quick response code) or a web hyperlink as the VOIP services signup session token a web hyperlink as the VOIP services signup session token. The printable image or web hyperlink may be accessible by the mobile device before or during the signup session. Alternatively, the printable image or web hyperlink may be accessible by another device before or during the signup session. In other words, the signup session for a mobile device may occur with or without the related mobile device.

To support the streamlined procurement/configuration, the server-side VOIP operations also may include storing VOIP services configuration options associated with a subscription for a user of the mobile device, and transferring the subscription to a new mobile device for the user as needed. The server-side VOIP operations also may include invalidating the subscription in response to a notification that the mobile device has been lost or stolen, wherein said invalidating the subscription causes the VOIP services to be unavailable for the mobile device.

In some embodiments, the client-side VOIP operations for streamlined procurement and configuration may include various steps. Such client-side VOIP operations may be performed by a computer or mobile device executing a telephony application. The client-side VOIP operations may comprise initiating a signup session for VOIP services on a mobile device, and streamlining configuration of at least some of the VOIP services for the mobile device during the signup session based on a VOIP services signup session token. The step of streamlining configuration of at least some of the VOIP services may include streamlining configuration of one-touch call transfer options, streamlined conferencing options, and/or contact list options for the mobile device during the signup session based on the VOIP services signup session token. The client-side VOIP operations may further comprise extracting information from a scanned printable image or a web hyperlink corresponding to the VOIP services signup session token to streamline configuration of at least some of the VOIP services.

In at least some embodiments, the client-side VOIP operations may further comprise streamlining the entry of signup data for a user of the mobile device based on the VOIP services signup session token. The signup data may comprise a phone number, a name, an address, an email, and a password. The client-side VOIP operations may further comprise streamlining the entry of billing information for a user of the mobile device based on the VOIP services signup session token. The client-side VOIP operations may further comprise streamlining the entry of SIP settings for the mobile device based on the VOIP services signup session token. The client-side VOIP operations may further comprise streamlining the entry of enterprise information associated with a user of the mobile device based on the VOIP services signup session token.

The operation of the VOIP services, including the streamlined procurement/configuration features disclosed herein, depends on the availability of hosted communication services and remote/mobile users who are connected to a "data service" via digital connections that are routed back to an Internet cloud. As long as a reliable digital path back to the host services is at a reasonable bit rate, the functionality described herein enables users to transact seamless communication features from their mobile devices regardless of the network that is used for communications.

It is common for mobile devices to have access to a large library of downloadable applications that, when purchased via electronic financial transactions or copied from another device, perform wide variety of functions such as games, GPS searches, storefront shopping, chat groups, etc. These applications are normally purchased en masse under a one-size-fits-all concept and are implemented in languages like JAVA to make them more interoperable between platforms, thus increasing the user base. Specifically, when an application is run, customization options are entered by the user and saved while the app is running. From that point on, the operation of the applications changes depending on the user-defined preferences. A customization process is disclosed herein to facilitate the usage of a telephony application without having to spend excessive time on local configurations that must be repeated over and over. In some embodiments, customized VOIP service features including one-touch call transfer features, streamlined conferencing features, and contact list features are included as part of a downloaded application at the time a subscription is activated during or after a signup session. Further, customized entry of user data, of enterprise data, of device data, and/or of billing data may occur for a downloaded application at the time a subscription is activated during or after a signup session.

FIG. 1 shows a block diagram of a network environment 100 in accordance with an embodiment of the disclosure. In the network environment 100, a hosted (or virtual) cloud communication system cluster 102 controls the disclosed VOIP service and streamlined procurement/configuration features for both wired and wireless devices via a communication structure including a combination of Internet (cloud) networks 108, push notification providers 106, e-commerce storefront websites 104, hard wired connections 144, cellular network (e.g., 4G/3G) connections 140, and/or Wi-Fi links 142 to mobile users. The designation of hard wired connections 144 in the network environment 100 is intended to represent a suitable configuration rather than a requirement.

In FIG. 1, a mobile device layer 120 is able to communicate with the cloud communication system cluster 102 for VOIP services as disclosed herein via a cellular network layer 110 and/or an enterprise layer 130. More specifically, the mobile device 122 may implement a wireless transceiver to communicate with at least one base station 114 of the cellular network layer 110 via a digital link 140. The base stations 114 couple to a cellular network 112 (e.g., a 4G/3G network), which communicates with the cloud communication system cluster 102 via the digital network 108. The cellular network layer 110 provides wireless services on a wide area basis to subscribers using services such as cellular plans and data plans. The interconnected series of base stations 114 and switching centers provide a communication path for users on the go (roaming) to connect to VOIP services provided by the cloud communication system cluster 102. Integration initiatives between cellular networks 112 and other types of networks have allowed certain communication features to be seamlessly extended to the Internet via cloud connections.

The wireless transceiver of the mobile device 122 also may enable communications with at least one Wi-Fi network 109 that links the mobile device 122 to the enterprise layer 130. As shown, the enterprise layer 130 may comprise at least one Wi-Fi network 109, a router 136, computer systems 138, and/or fixed telephony devices 134. Without limitation to other embodiments, some or all of these enterprise layer components may be installed in an office building 132 associated with an enterprise. As shown, the router 136 communicates with the cloud communication system cluster 102 via the digital network 108. The digital network 108, sometimes referred to herein as the Internet or "cloud", enables ongoing communications between all the connected entities using a communication protocol such as transmission control protocol/internet protocol (TCP-IP) or user datagram protocol (UDP). Such communications are provided, for example, by a public carrier service that is available by subscribing to an Internet Service Provider (ISP).

Without limitation to other embodiments, various criteria for the networked system 100 include use of virtual or cloud private branch exchange (PBX) technology for system functions. Further, the networked system 100 may support a mobile device user that is associated with multiple wireless devices or wired devices. Further, the network system 100 enables registration and pre-configuration of VOIP services and streamlined conferencing features to be utilized by the mobile device 122. Further, the mobile device 122 may correspond to one of many possible brands of cell phones or smart phones.

To summarize, the networked system 100 enables the mobile device 122 to receive/make calls based on the VOIP service provided by the cloud communication system cluster 102. As disclosed herein, the VOIP service includes streamlined procurement/configuration features that may be based on communications between the mobile device 122 and other components in the networked system 100.

Figure 2:
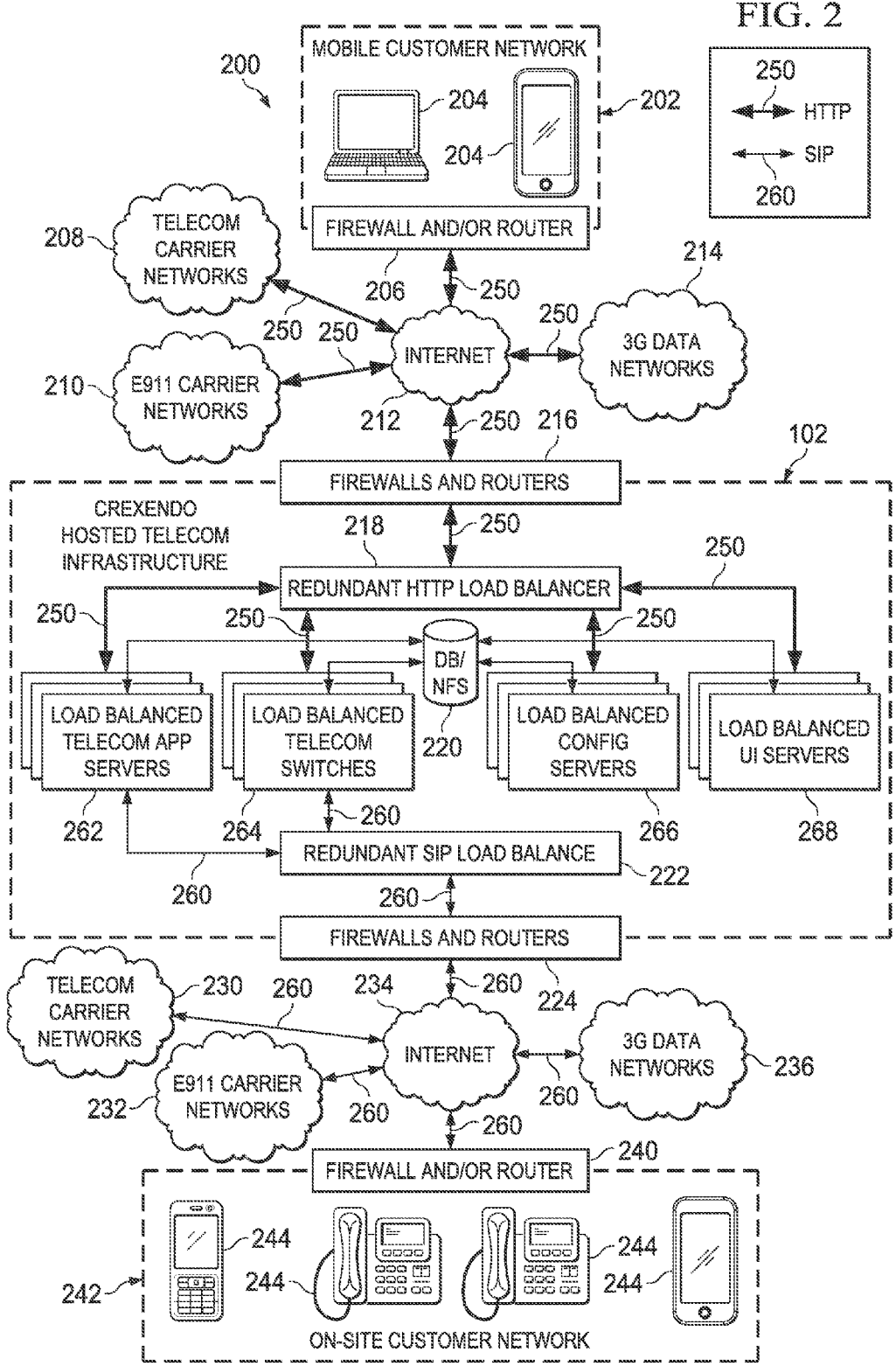
FIG. 2 shows a block diagram of a system to support Voice Over IP (VOIP) services in accordance with an embodiment of the disclosure.

FIG. 2 shows a block diagram of a system 200 to support VOIP services in accordance with an embodiment of the disclosure. The system 200 comprises the cloud communication system cluster 102 mentioned for FIG. 1 as well as other components. As shown, the cloud communication system cluster 102 comprises firewalls/routers 216 and 224 that filter and manage the transfer of data packets into and out of the cloud communication system cluster 102. Such data packets include communications to/from devices 204 of a mobile customer network 202 (e.g., corresponding to mobile and remote users) and communications to/from devices 244 that are part of an on-site customer network 242 (e.g., corresponding to users at an enterprise office location).

As an example, data packets from devices 204 of the mobile customer network 202 may be directed to the cloud communication system cluster 102 via a firewall/router 206 associated with the mobile customer network 202 and via the Internet 250 using hypertext transfer protocol (HTTP) links 250. Various networks such as telecom carrier networks 208, E911 carrier networks 210, and 3G data networks 214 may communicate via the Internet 212 to the devices 204 of the mobile customer network 202 and/or the cloud communication system cluster 102 using HTTP links 250. Similarly, data packets from devices 222 of the on-site customer network 242 may be directed to the cloud communication system cluster 102 via a firewall/router 240 associated with the on-site customer network 242 and via the Internet 234 using session initiation protocol (SIP) links 260. Various networks such as telecom carrier networks 230, E911 carrier networks 232, and 3G data networks 236 may communicate via the Internet 234 to the devices 244 of the on-site customer network 242 and/or the cloud communication system cluster 102 using SIP links 260.

In accordance with at least some embodiments, the cloud communication system cluster 102 comprises a redundant HTTP load balancer 218 and a redundant SIP load balancer 222 in communication with load balanced telecom application servers 262 and load balanced telecom switches 264 via respective HTTP links 250 and SIP links 260. The redundant HTTP load balancer 218 also is in communication with load balanced configuration servers 266 and load balanced user interface (UI) servers 268. The redundant HTTP load balancer 218 manages distribution of data packets over HTTP links 250 to the load balanced telecom application servers 262, the load balanced telecom switches 264, the load balanced configuration servers 266, and the load balanced user interface (UI) servers 268. Similarly, the redundant SIP load balancer 222 manages distribution of data packets over SIP links 260 to the load balanced telecom application servers 262, and the load balanced telecom switches 264. In operation, the various servers 262, 266, and 268 perform the VOIP services described herein based on applications being executed and data received from database/NFS (network file system) 220 as well as data received from the mobile customer network 202 and/or the on-site customer network 242. In at least some embodiments, the load balanced telecom switches 264 support communication operations and/or packet transfers related to the VOIP services described herein. Further, the balanced telecom application servers 262 and the load balanced UI servers 268 support user access to account information related to the VOIP services described herein. Further, the load balanced configuration servers 266 manage configuration options for the VOIP services described herein.

Without limitation to other embodiments, the load balanced telecom application servers 262, the load balanced telecom switches 264, the load balanced configuration servers 266, the load balanced UI servers 268, and the database/NFS 220 are customized to provide the VOIP services disclosed herein. Meanwhile, the firewall/routers 206, 216, 224, and 240, the redundant HTTP load balancer 218, and the redundant SIP load balancer 222 may correspond to off-the shelf components.

Figure 3:
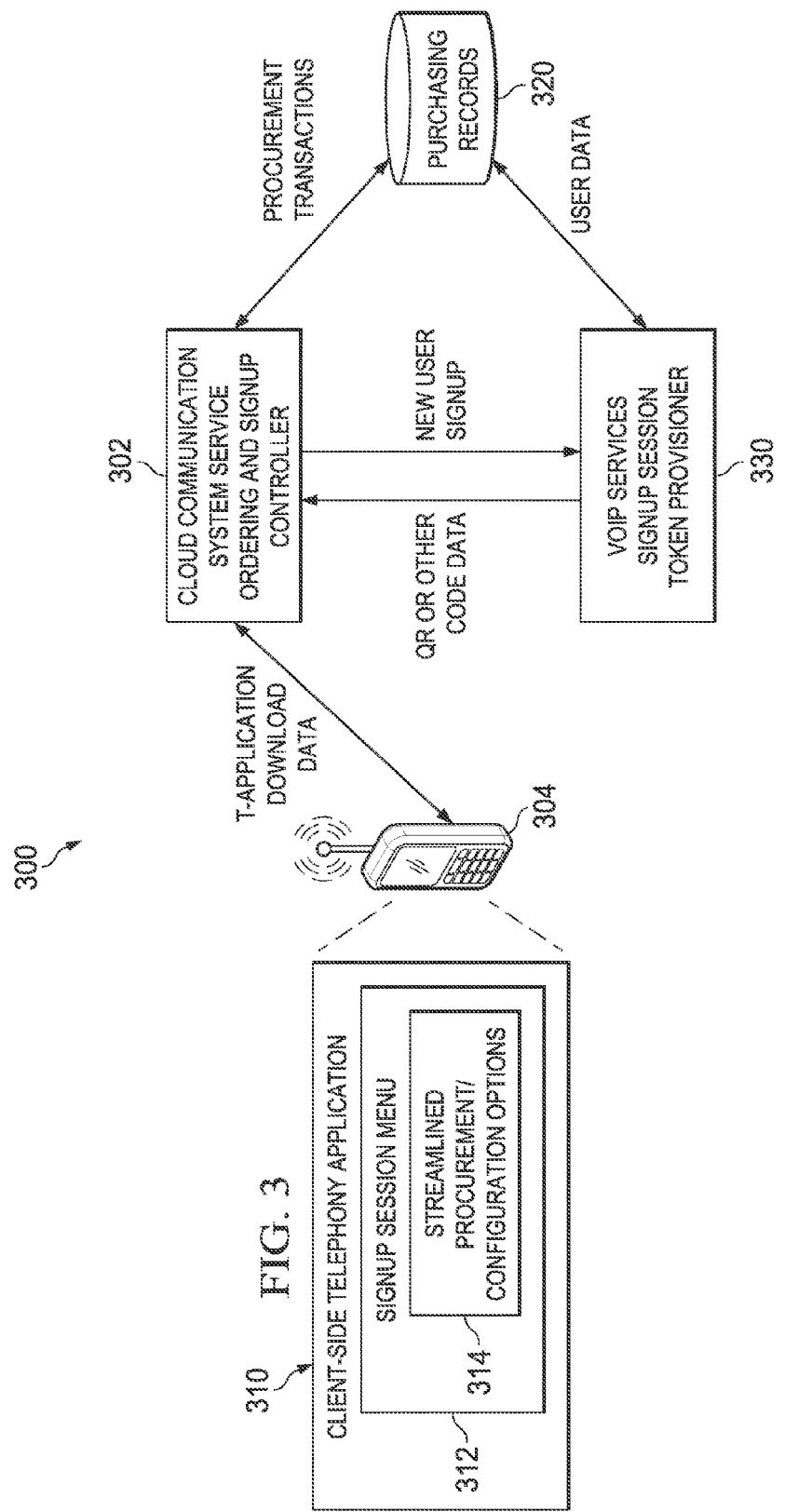
FIG. 3 shows a signup operation for VOIP services in accordance with an embodiment of the disclosure.

FIG. 3 shows a streamlined procurement/configuration operation 300 for VOIP services in accordance with an embodiment of the disclosure. As shown, the streamlined procurement/configuration operation 300 involves a mobile device 304 in communication with a cloud communication system service ordering and signup (CCSSOS) controller 302, which may represent logic or executable instructions performed by the servers 262, 266, 268 of the cloud communication system cluster 102 described previously. For the streamlined procurement/configuration operation 300, the CCSSOS controller 302 is in communication with a purchasing records database 320 and a VOIP services signup session token provisioner 330. For example, the CCSSOS controller 302 may receive notification of or participate in a VOIP service signup or upgrade transaction. Thus, information regarding procurement transactions may be transmitted from the CCSSOS controller 302 to the purchasing records database 320 or vice versa. Further, user data related to transactions that have been completed or that are still in process may be transmitted from the purchasing records database 320 to the VOIP services signup session token provisional 330 or vice versa. The VOIP services signup session token provisioner 330 also may receive new user signup data from the CCSSOS controller 302. Based on the new user signup data and/or the user data, the VOIP services signup session token provisioner 330 is able to provide a unique QR code, a hyperlink, or other token to the CCSSOS controller 302. By processing the information (e.g., an identifier, or related information used for signup/configuration) associated with the unique QR code, a hyperlink, or other token, the CCSOS controller 302 is able to streamline the entry of signup information or to streamline configuration VOIP service features during a signup session between mobile device 304 and the CCSSOS controller 302.

In accordance with the streamlined procurement/configuration operation 300 of FIG. 3, a client-side telephony application 310 provides a signup session menu 312 with streamlined procurement/configuration options 314. Upon purchase of new or upgraded VOIP services, new users are guided through a series of screens corresponding to the signup session menu that allows them to sign up for a new or upgraded mobile account using a unique identifier for the mobile device. A service provider may also complete the provisioning of other features, such as hosted fax and multi-party conference bridging, through a separate web portal interface using an administrator function. A basic user signup begins with a login screen. If the user selects a new user option, the user is guided through a series of screens that allows them to create a new mobile account with their own direct inward dial (DID) number for the corresponding mobile device. Various steps of a signup process are represented by the example screenshots of FIGS. 6A-6H. Note that the screens corresponding to FIGS. 6A-6H could be either in the form of mobile device web-pages or in a telephony application user interface. Also note that some or all of the screens may be skipped based on a VOIP services signup session token as described herein. In other words, the VOIP services signup session token used during the may enable streamlined entry of data and thus certain screens may be skipped since the data has already been entered. Alternatively, the data may be auto-entered for a given screen based on the VOIP services signup session token, but the user may still approve and/or edit the entered information.

Without limitation to other embodiments, various steps may be used to set up a new mobile account. For example, a customer may enter an area code as part of choosing a number based on inputting an area code (e.g., see FIG. 6A), or by entering location information (e.g., city, state, GPS location). Further, web services may be used to retrieve a list of available numbers, which are displayed to the user for selection (e.g., see FIG. 6B). Further, customer contact information such as a name, an email address, a phone number, and/or address may be entered (e.g., see FIG. 6C). Further, a password may be entered and verified (e.g., see FIG. 6D). Further, terms and conditions requiring user acceptance may be presented (e.g., see FIG. 6E). Further, payment information and a billing address may be entered (e.g., see FIG. 6F). Further, order details may be displayed, including a billing breakdown (e.g., see FIG. 6G). Further, an "order compete" screen may be displayed (e.g., see FIG. 6H). Once an order is complete, a user license is created along with an associated email and password with a keychain for the license. In addition, a hosted telecom account for the selected DID, the mobile device, a new auto-generated extension, and/or a telephony application is created.

In at least some embodiments, clicking a login button after the account is established automatically logs the user in and causes a main screen (e.g., a keypad screen) of the client-side telephony application 310 to be displayed. Further, various features of the client-side telephony application 310 such as one-touch call transfers features, streamlined conferencing features, and/or contact list features may be configured based on the VOIP services signup session token used for a signup/configuration of the mobile device 304. Further, the client-side telephony application 310 may be customized by the distributing entity (e.g., an app store) to be compatible with the operating system and/or hardware features of the mobile device 304. In this manner, the mobile device platform is able to support a set of call processing functions appropriate for the network and services arrangement that will be used.

Figure 6A:
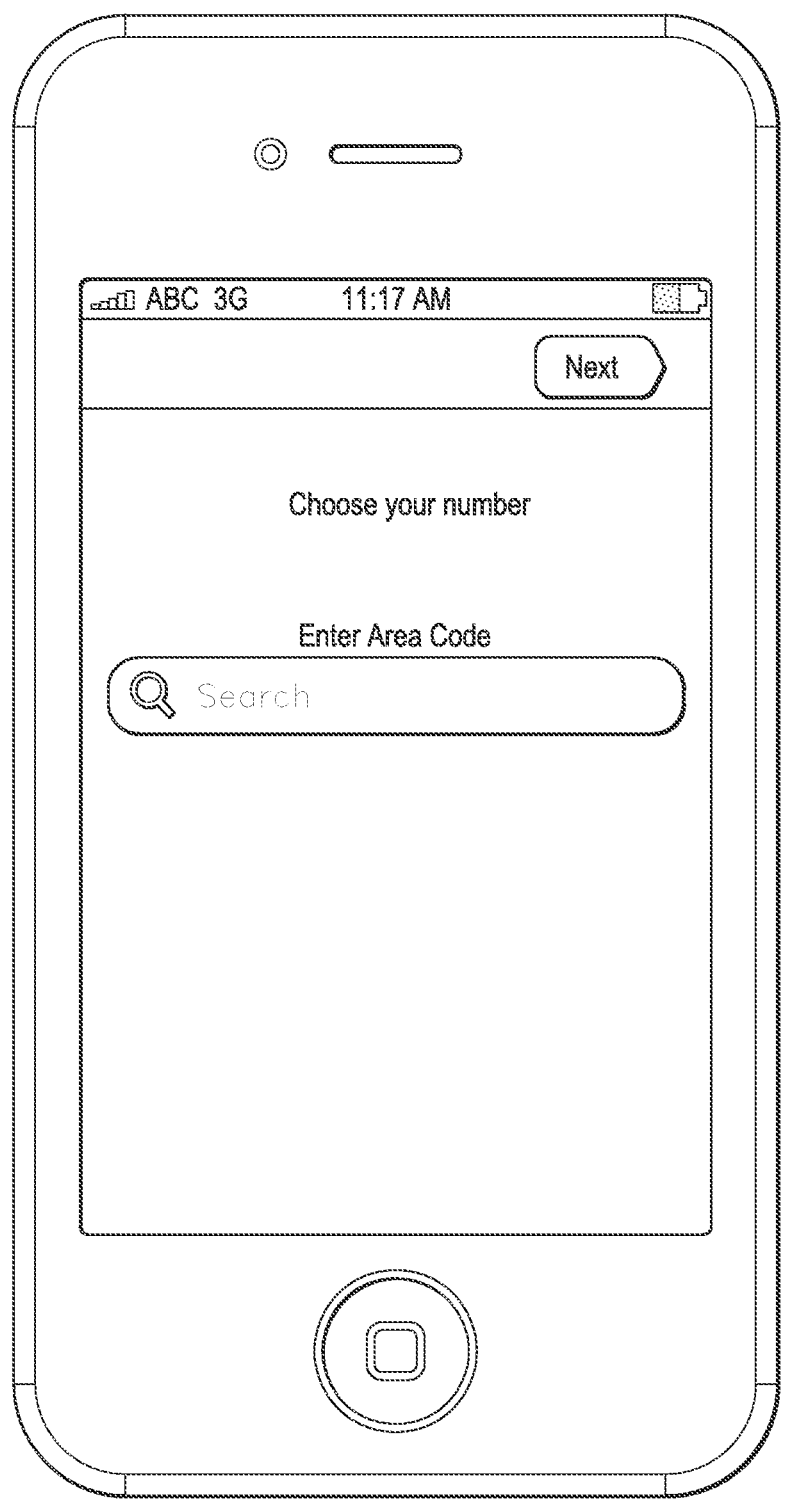
FIGS. 6A-6L shows screenshots of a client-side telephony application in accordance with an embodiment of the disclosure.
Figure 6B:
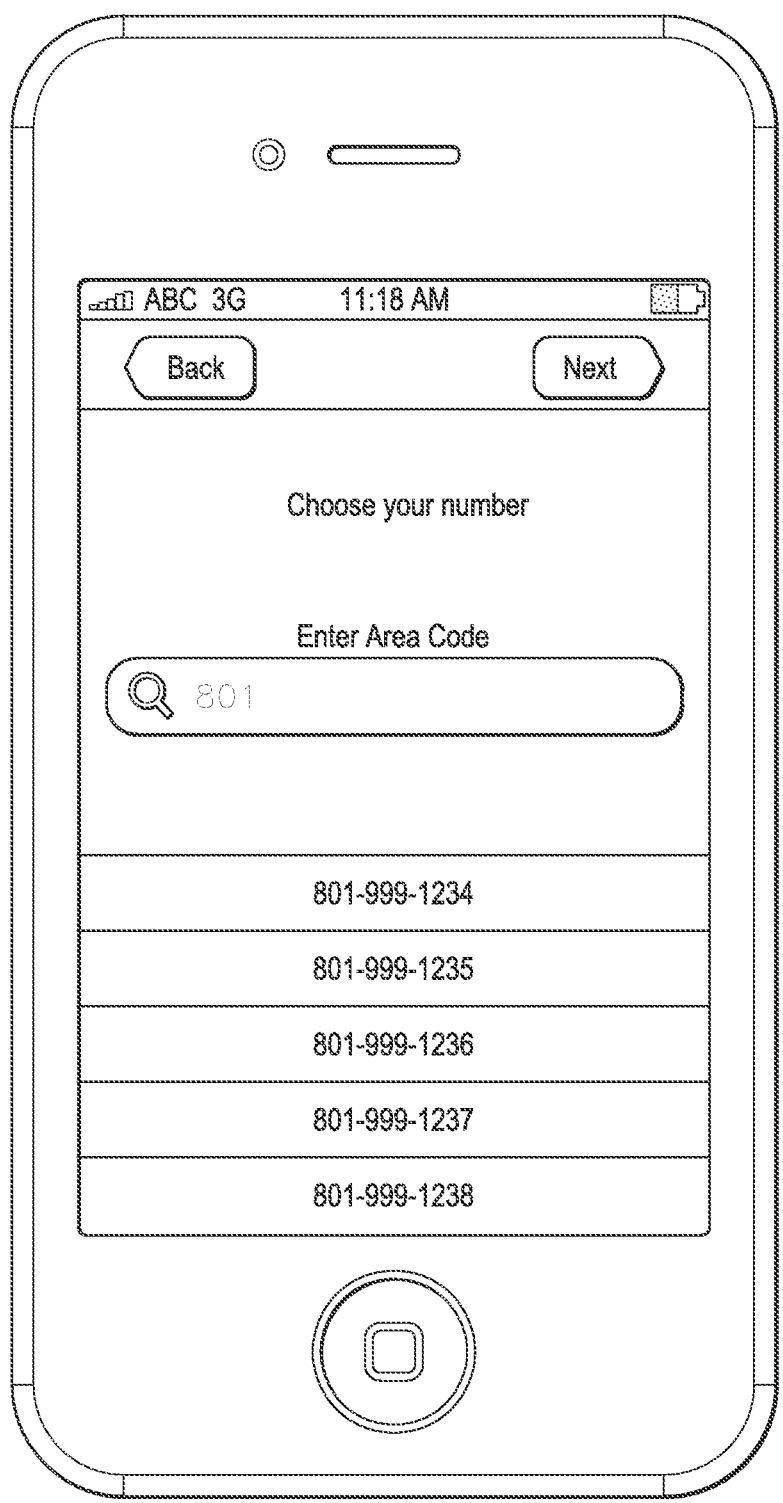
Figure 6C:
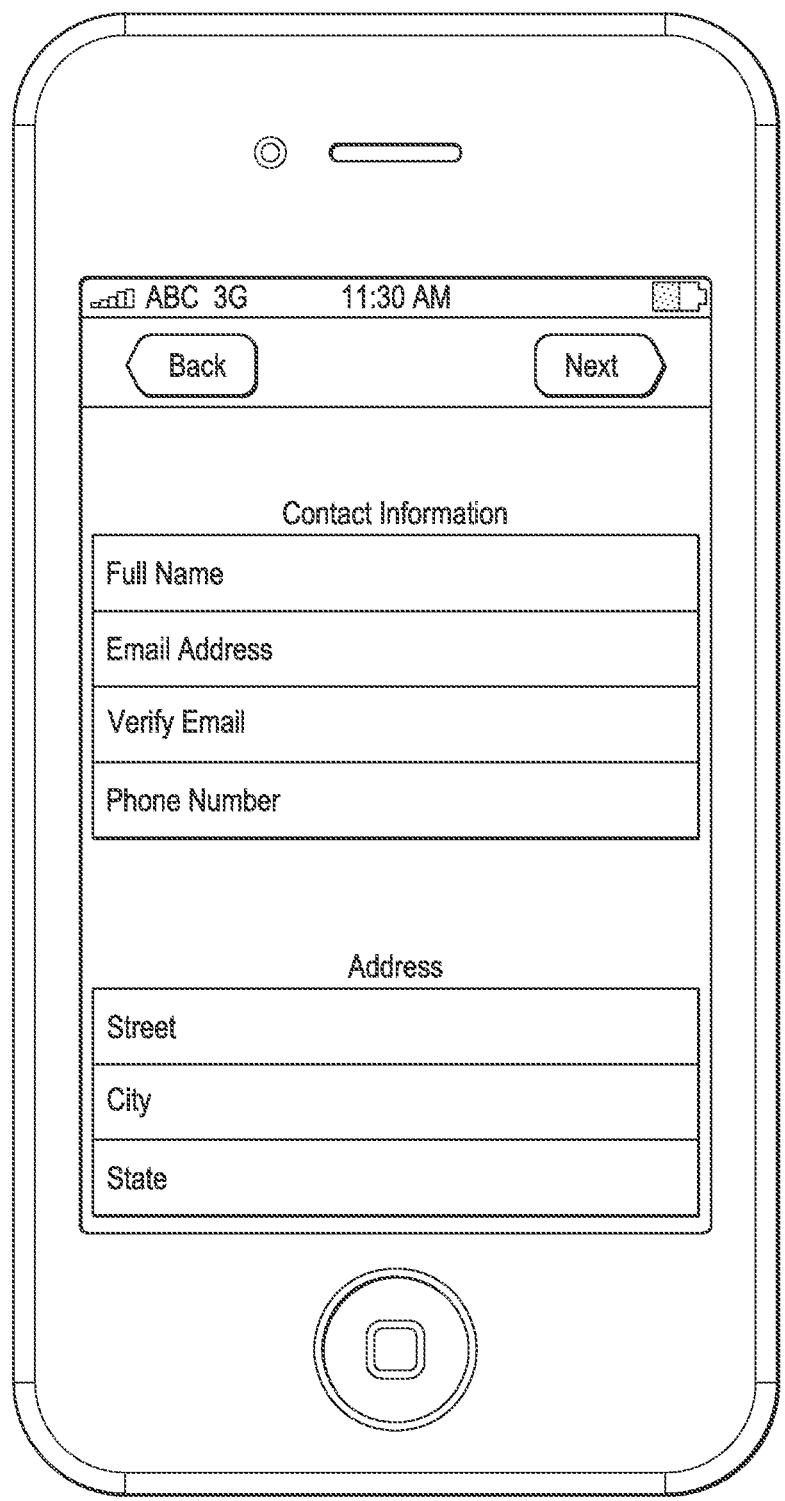
Figure 6D:
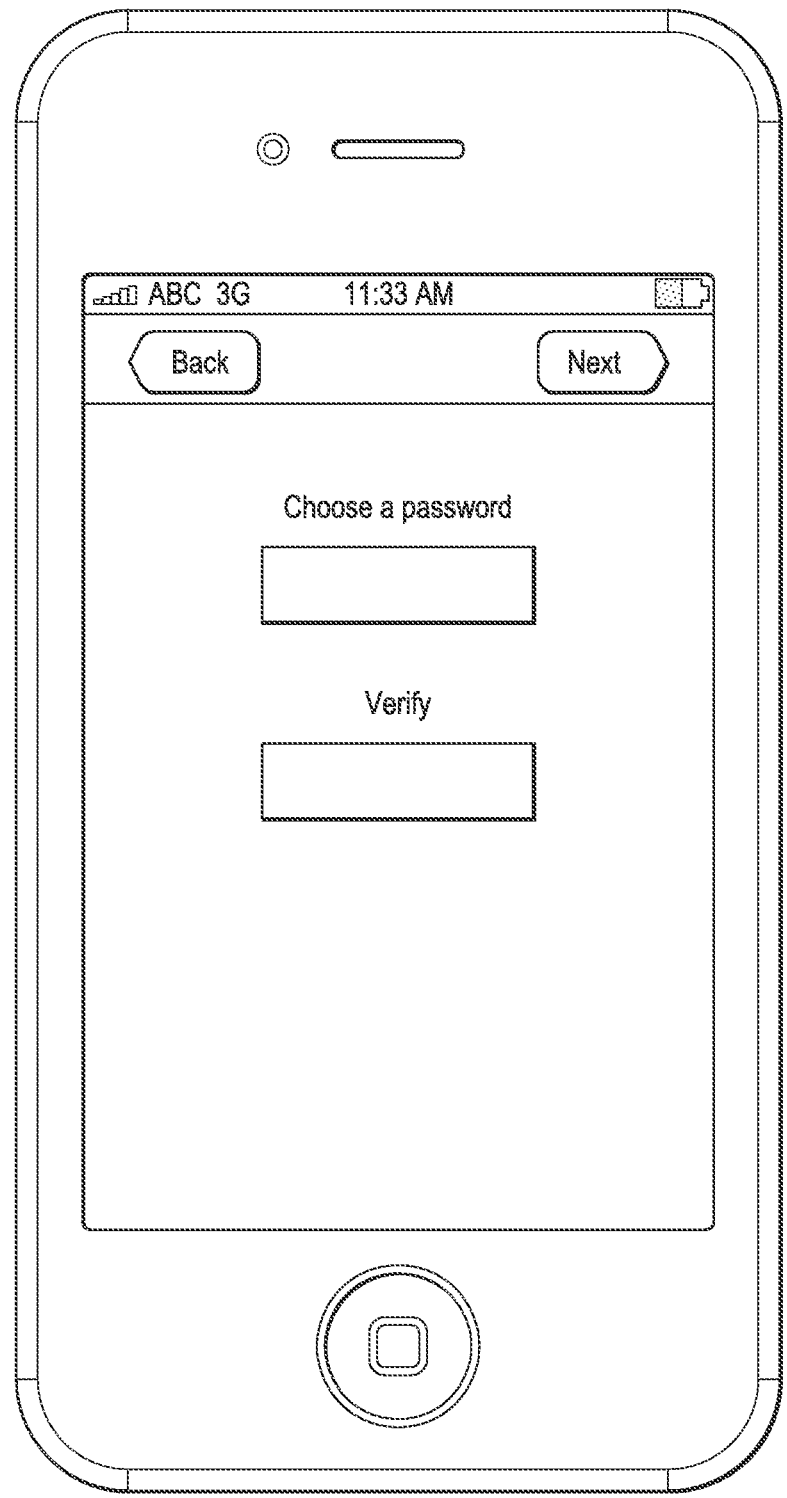
Figure 6E:
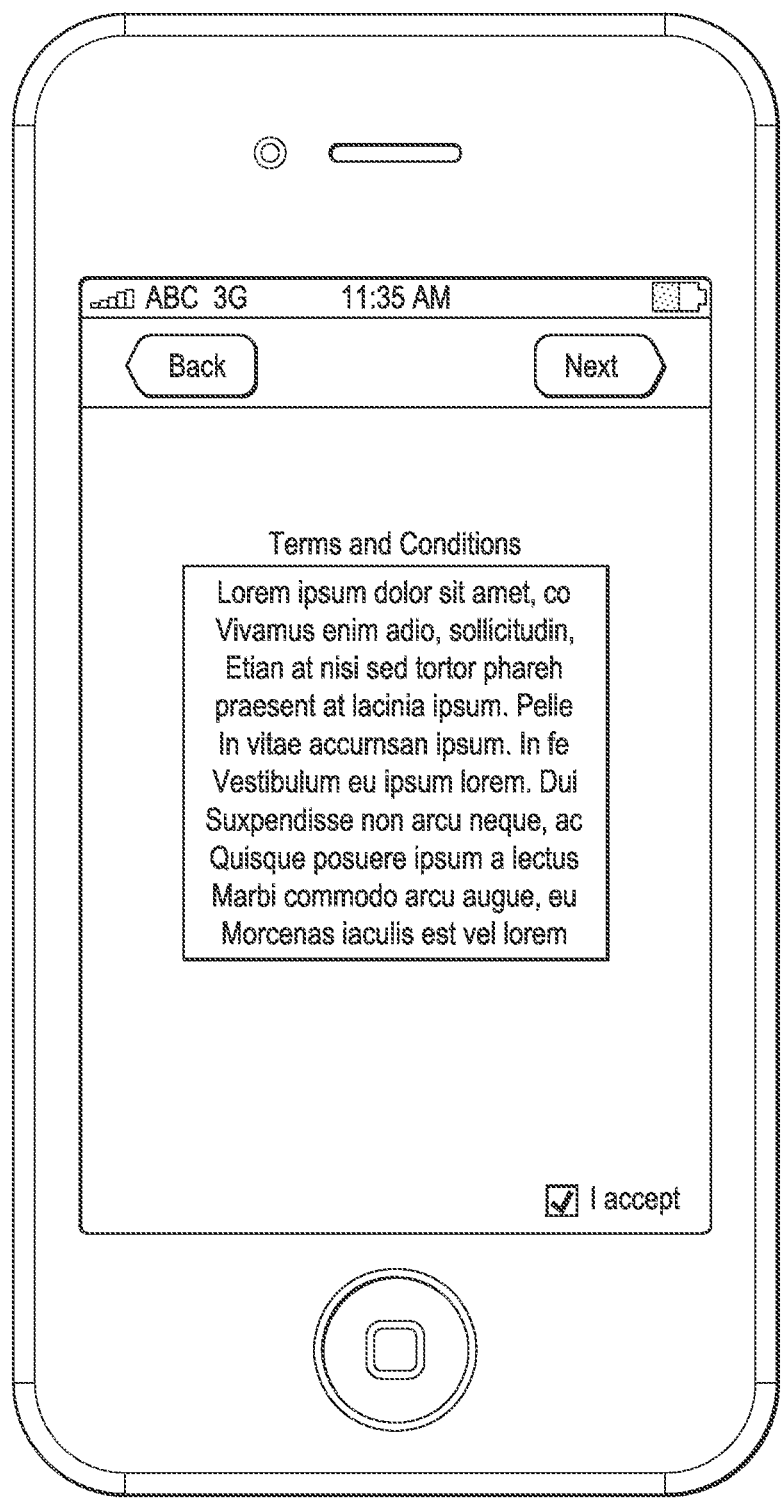
Figure 6F:
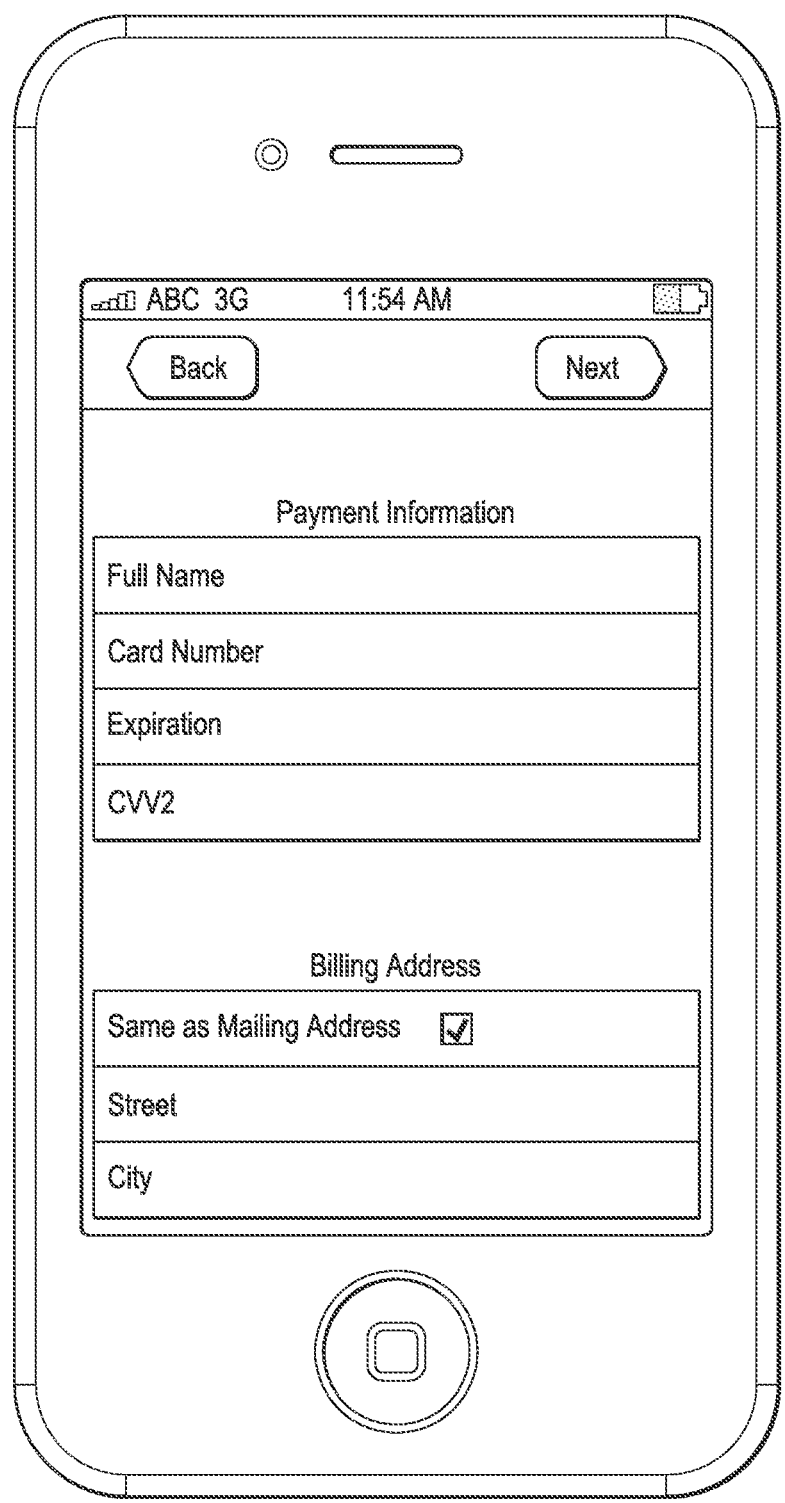
Figure 6G:
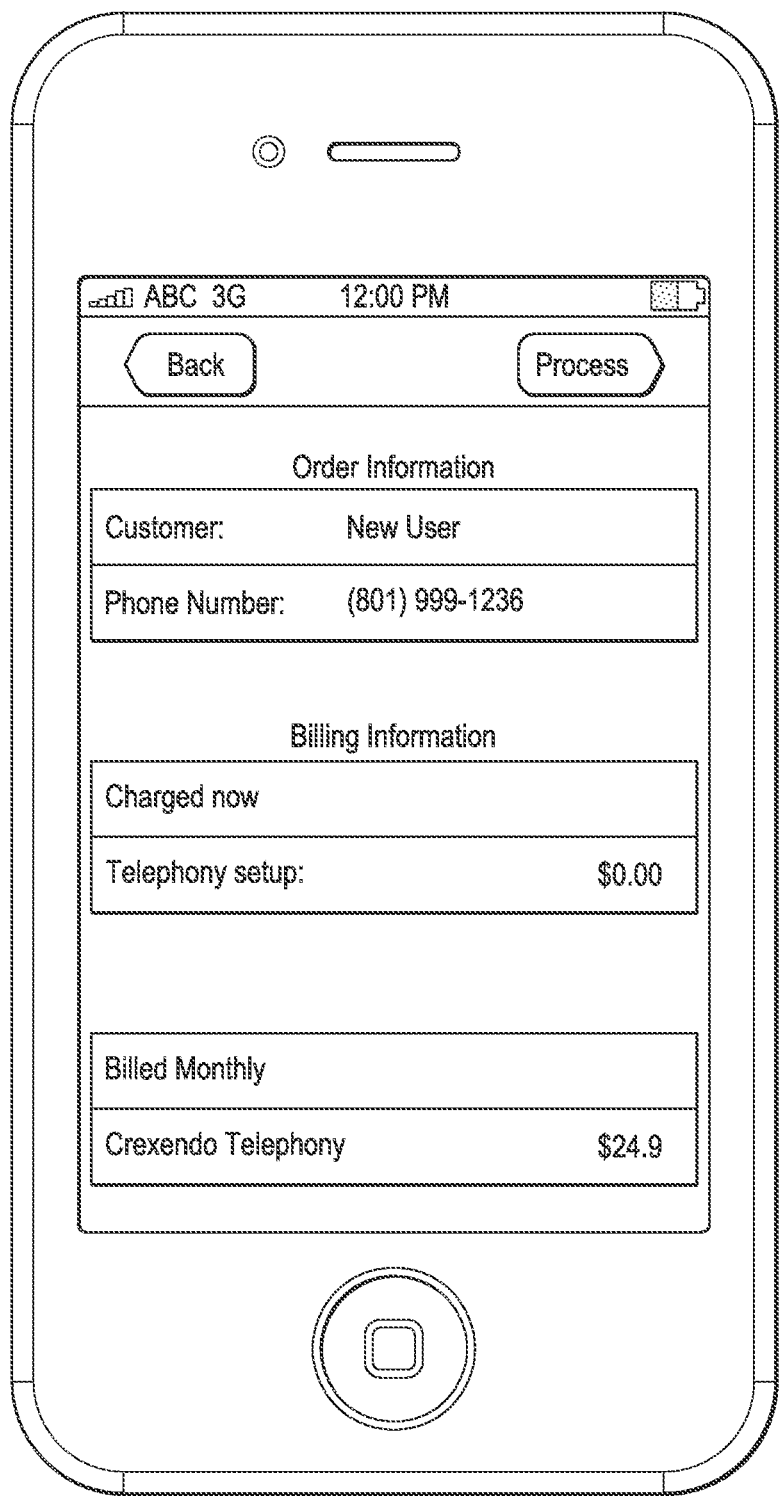
Figure 6H:
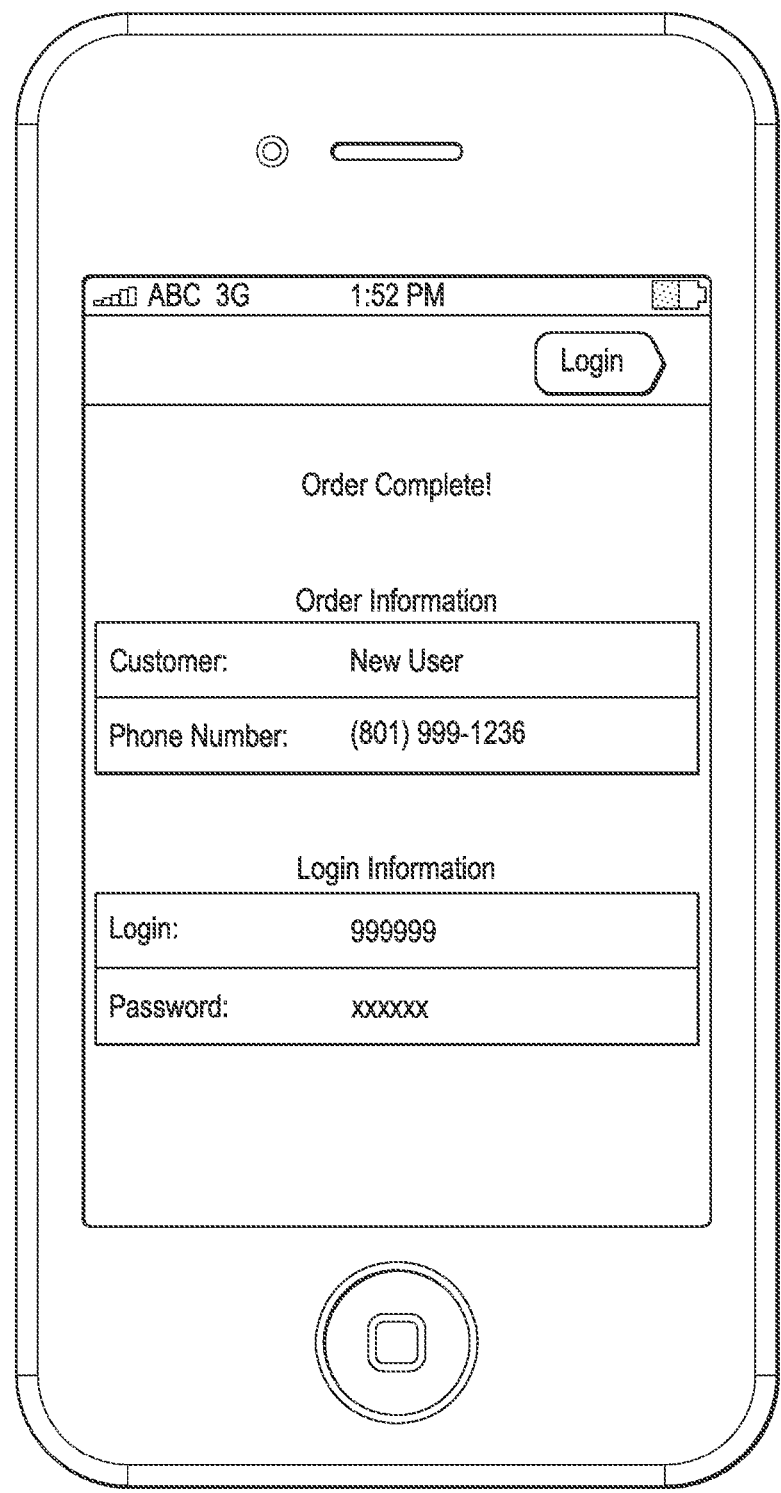
Figure 6I:
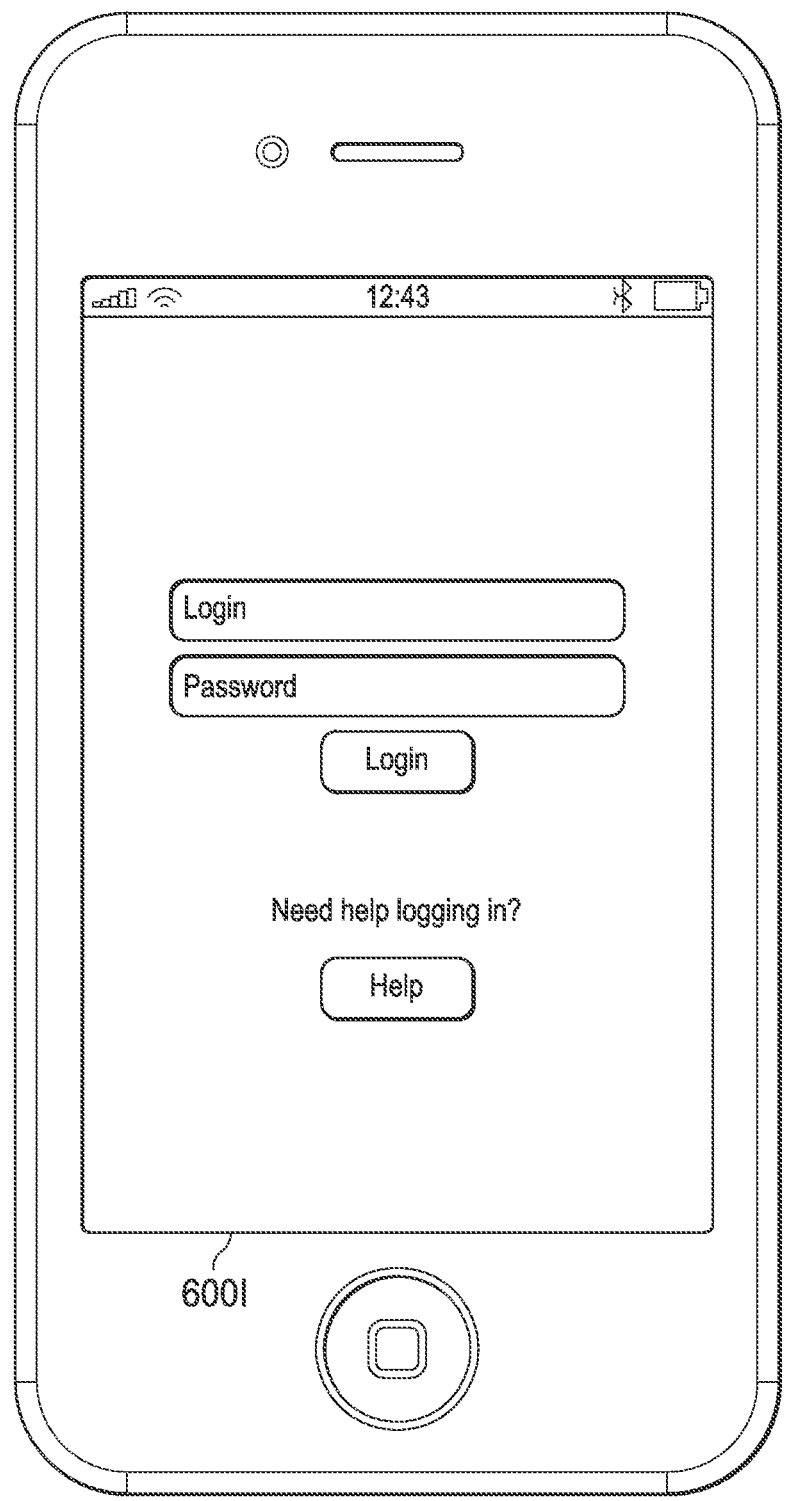

Without limitation to other embodiments, FIGS. 6I-6L shows screenshots 600A-600M of a client-side telephony application after a signup session is complete in accordance with some embodiments of the disclosure. In FIG. 6I, screenshot 600I shows a login screen with a login entry space, a password entry space, a login button, and a help button. Once the login button is pressed, authentication of the information in the login entry space and the password entry space is attempted. If login is successful, a VOIP service session is initiated.

Figure 6J:
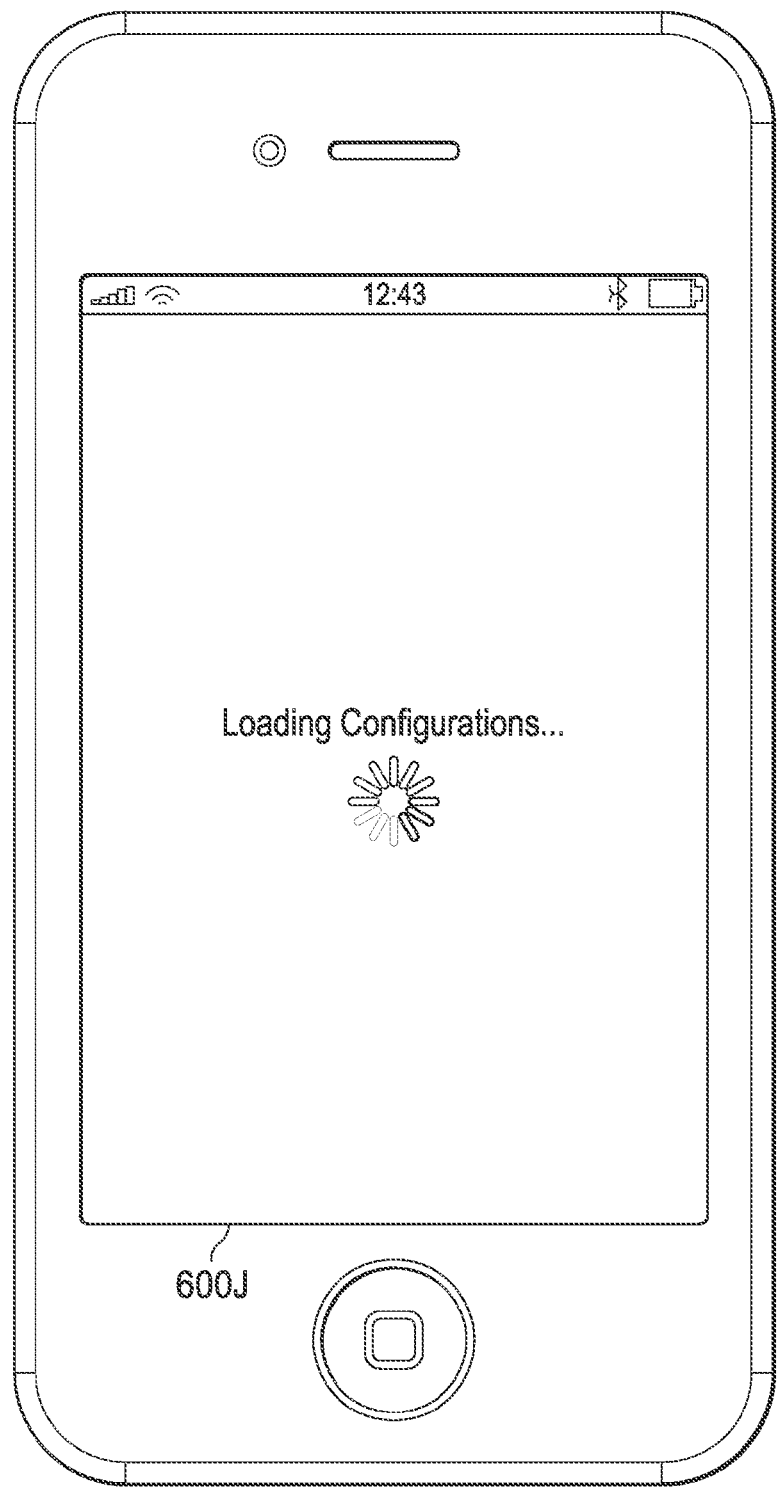

In FIG. 6J, screenshot 600J shows that a VOIP service session begins by loading configuration information. The loading of configuration information may account for updates to the VOIP service; including updates to VOIP service features that have been stored by the cloud communication system cluster 102, but that are not yet stored on the mobile device executing a client-side telephony application.

Figure 6K:
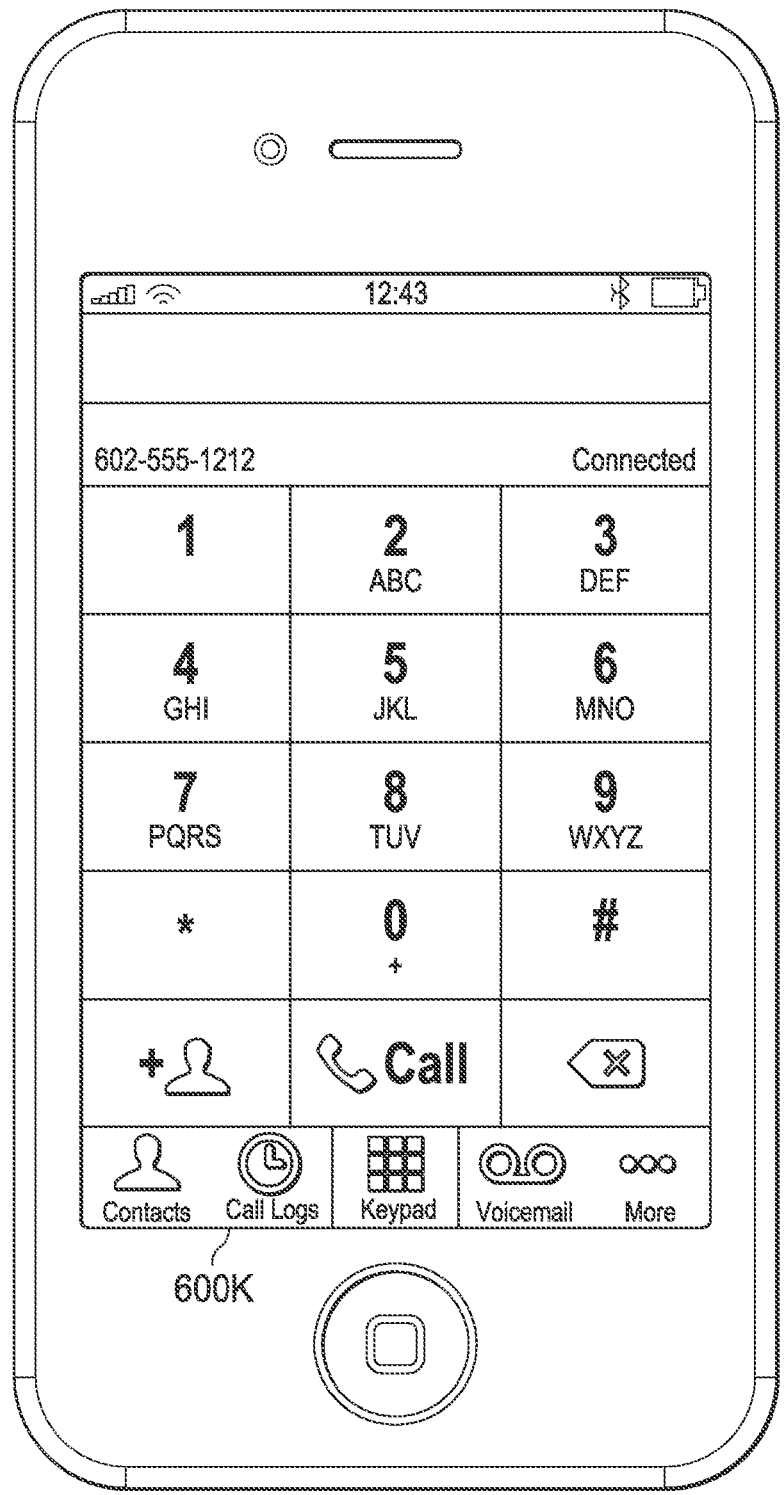
Figure 6L:
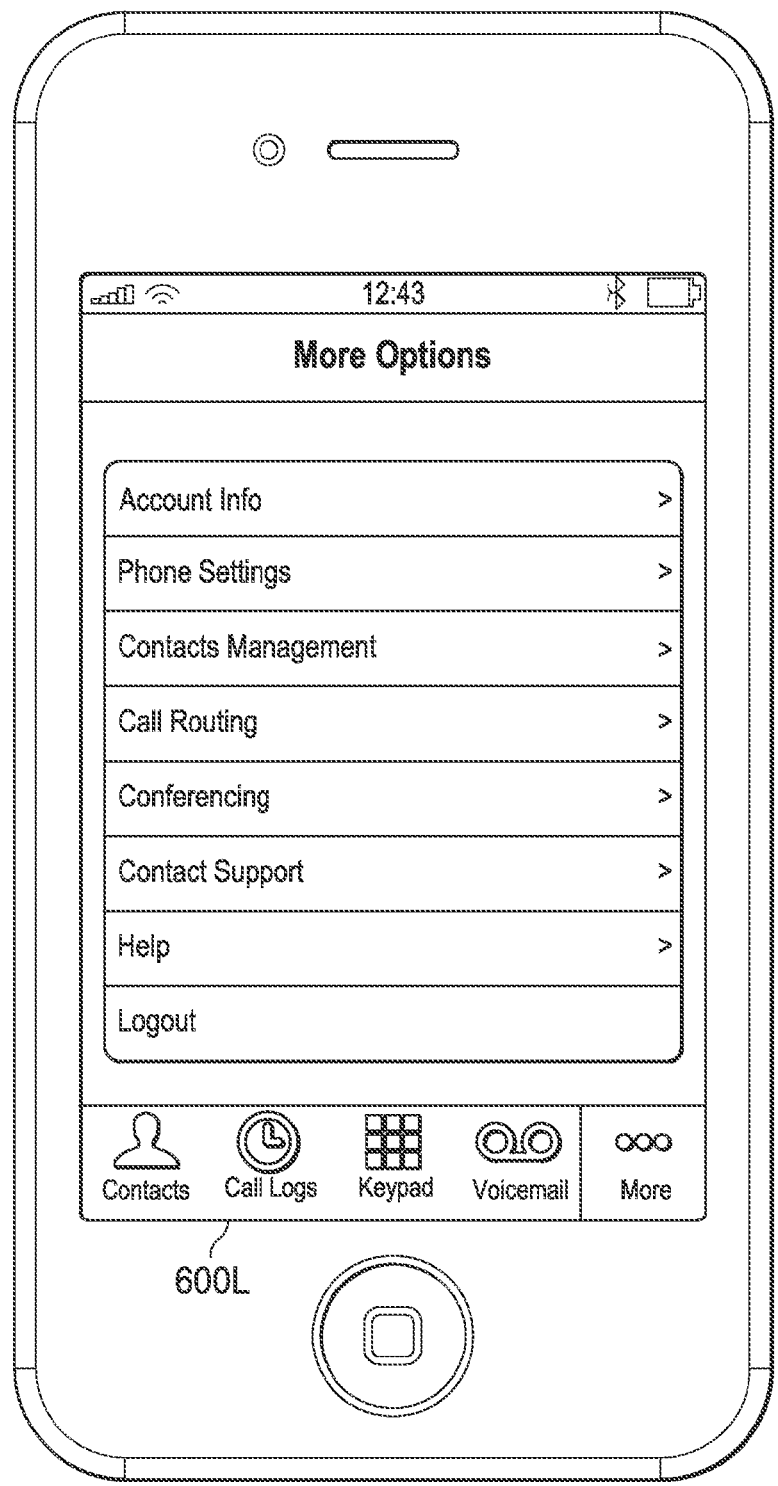

In FIG. 6K, screenshot 600K shows a keypad screen that enables a user to place a call in response to selection of a "keypad" icon. The screenshot 600K also shows other selectable icons or buttons including a "contacts" icon, a "call logs" icon, a "voicemail" icon, and a "more" icon. FIG. 6L shows a screenshot 600L that displays various options when the "more" icon of the client-side telephony application is selected. More specifically, selectable tabs for account information, phone settings, contacts management, call routing, conferencing, contact support, help, and logout are displayed. By selecting the contacts management tab, a user is able to review and/or modify contact options that were configured during a signup session based on a VOIP services signup session. By selecting the call routing tab, a user is able to review and/or modify call routing options that were configured during a signup session based on a VOIP services signup session. By selecting the conferencing tab, a user is able to review and/or modify streamlined conferencing options that were configured during a signup session based on a VOW services signup session.

In some embodiments, the client-side telephony application 310 may automatically be included with the purchase of the mobile device 304 or may be added when the mobile device 304 is signed up for VOIP service (e.g., when referred to a cloud communication system port code). This may be done either by an administrator or by the mobile user using the steps shown above. Once the client-side telephony application 310 is installed, it may continue to control the features associated with the VOIP services described herein for the life of the mobile device 304. In some embodiments, client-side telephony application 310 also may be downloaded automatically if a new device is connected to recover from a loss or failure. In this manner, the client-side telephony application 310 is appropriate for the type of mobile device (IPHONE, ANDROID, BLACKBERRY, IPAD, etc.). Further, options that were purchased as part of the user's original subscription may be obtained again under an abbreviated provisioning procedure to reconstruct the original options embedded in configuration data of the client-side telephony application 310. This allows the client-side telephony application 310 to perform in accordance with the capabilities as originally purchased.

In accordance with some embodiments, configuration data that may be used for a signup session or configuration of the client-side telephony application 310 includes, but it not limited to signup data such as a desired phone number (DID), contact information, a name, an email, a password, a contact phone number, a mailing address, and a time zone. Further, billing information such as full name, credit card number, credit card expiration, credit cart CVV2, billing address, or subscription configuration data may be used for a signup session or configuration of the client-side telephony application 310. Further, session initiation protocol (SIP) settings such as a server address/port, a domain, a username, and a password may be used for a signup session or configuration of the client-side telephony application 310. Further, customer or enterprise identification such as a tenant ID, an employee ID, or an employee name may be used for a signup session or configuration of the client-side telephony application 310. Further, phones settings such as an alias ID, an alias display name, or an extension may be used for a signup session or configuration of the client-side telephony application 310. Further, miscellaneous settings such as a codec list or quality of service (QOS) settings may be used for a signup session or configuration of the client-side telephony application 310.

In accordance with some embodiments, a record of each issued client-side telephony application 310 is stored on the communications system's database for future reference. Further, automatic upgrades to the client-side telephony application 310 may be configured to include additional purchased features. If the mobile device 304 is able to register with more than one communications system, multiple client-side telephony applications may be downloaded and a management interface may be invoked to determine which will take control at runtime.

Because the distributor (store) of the client-side telephony application 310 is aware of the user's corporate environment or subscriber class, a certain amount of customization is applied to the client-side telephony application 310 before download, either in form of customized software code or by using specific configuration data that is downloaded as part of, or otherwise associated with the client-side telephony application 310. Specifically, a configuration-specific piece of information is downloaded that affects the user's membership in a corporate environment. These represent various phone settings, including the Alias ID, the alias display name, and the extension described herein. These fields are used to identify the individual Mobile Device in a corporate, organizational, or other group environment.

As an example, suppose John Williams has two mobile devices. One is used in the car as a built-in unit and John takes the other one along with him. In one mode of operation, the same alias ID and alias display name is assigned to both of John's mobile extension numbers (Alias ID="JD_Williams_Mbl" and Alias display Name="John Williams (mobile)") using extension number 21573 and 21574. When John's name is viewed in the corporate directory, the only name that is displayed is John Williams (mobile). When this name is called, both phones are accessed and "forked" under a Session Initiation Protocol (SIP) command code and John picks up the call on the currently active mobile device. John's phone in the office at extension number 20611 has the Alias ID "JD_Williams_Ofc" and the display name "John Williams (office)". In this case, John's office phone is called only when the appropriate directory name is accessed by a caller or someone sending a message.

It is also possible to have one Alias Display Name (John Williams) assigned to both a mobile device and an office phone. In this case, the caller is not aware of the arrangement of John's phones and simply calls John Williams using the Alias Display Name. When the call is made, all three devices are forked using the SIP and John picks up the call on the appropriate device. In the embodiments disclosed herein, the contact list names or identifiers and any forking options are available for VOIP service features described herein.

FIG. 4 shows a mobile device 400 in accordance with an embodiment of the disclosure. The mobile device 400 may, for example, correspond to mobile device 122 of FIG. 1, the devices 204 of FIG. 2, or the mobile device 304 of FIG. 3. As shown, the mobile device 400 comprises a processor 402 coupled to a non-transitory computer readable storage 404 storing a client-side telephony application 410. The mobile device 304 also comprises input devices 430, a display 440, and a network interface 450 coupled to the processor 402.

The mobile device 400 is representative of a smartphone, a cellular phone, a personal digital assistant (PDA), a tablet computer, a laptop computer, or other mobile device configured to communicate with the cloud communication system cluster 102 for VOIP services. The processor 402 is configured to execute instructions read from the non-transitory computer readable storage 404. The processor 402 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

In some examples, the non-transitory computer readable storage 404 corresponds to random access memory (RAM), which stores programs and/or data structures during runtime of the mobile device 400. For example, during runtime of the mobile device 400, the non-transitory computer readable storage 404 may store the client-side telephony application 410 for execution by the processor 402 to perform the streamlined procurement/configuration features described herein. The client-side telephony application 410 may be distributed to the mobile device 400 via a network connection or via a local storage device corresponding to any combination of non-volatile memories such as semiconductor memory (e.g., flash memory), magnetic storage (e.g., a hard drive, tape drive, etc.), optical storage (e.g., compact disc or digital versatile disc), etc. Regardless the manner in which the client-side telephony application 410 is distributed to the mobile device 400, the code and/or data structures corresponding to the client-side telephony application 410 are loaded into the non-transitory computer readable storage 404 for execution by the processor 402.

The input devices 430 may comprise various types of input devices for selection of data or for inputting of data to the mobile device 400. As an example, the input devices 430 may correspond to a touch screen, a key pad, a keyboard, a cursor controller, or other input devices.

The network interface 450 may couple to the processor 402 to enable the processor 402 to communicate with the cloud communication system cluster 102. For example, the network interface 450 may enable the mobile device 450 to receive VOIP services and/or to update VOIP service options. In different embodiments, the network interface 450 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network interface 450 may enable the processor 402 to communicate with the Internet or one or more intranets. With such a network connection, it is contemplated that the processor 402 might receive information from the network, or might output information to the network in the course of performing the call transfer features described herein. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 402 executes instructions, codes, computer programs, scripts which it accesses from hard disk, floppy disk, optical disk (these various disk based systems may all be considered secondary storage), read-only memory (ROM), random access memory (RAM), the network interface 450, or the input devices 430. While only one processor 402 is shown, multiple processors may be present. Thus, while instructions may be discussed as executed by a processor, the instructions may be executed simultaneously, serially, or otherwise executed by one or multiple processors.

In accordance with at least some embodiments, the client-side telephony application 410 comprises a login module 412, a user interface module 414, a contact list sync module 416, and a streamlined procurement/configuration module 420. As shown, the streamlined procurement/configuration module 420 may comprise a signup session module 422 and a token interface module 424.

The login module 412 enables a user of the mobile device 400 to log into a VOIP service corresponding to a communication session established with the cloud communication system cluster 102. After a successful logic, a user interface is presented on the mobile device 400 based on instructions and formatting data in the user interface module 414. The user interface module 414 may provide a user interface that enables the user of the mobile device 400 to make/receive VOIP calls, to select from or update a contact list, to review a call log or voicemails, to select or update streamlined conferencing options, to select or update one-touch call transfer options, or to perform other operations.

The streamlined procurement/configuration module 420 enables expedited signup and configuration for VOIP services provided by the cloud communication system cluster 102 as described herein. The signup session module 422 enables presentation of signup screens such as those shown in FIGS. 6A-6H before other features of the client-side telephony application 410 are available. Although not required, the streamlined procurement/configuration module 420 may be separate from the client-side telephony application 410 (e.g., a separate application executed prior to installing or running the client-side telephony application 410).

The token interface module 424 enables a token to be used during a signup session to streamline procurement/configuration of VOIP services as described herein. As an example, the token interface module 424 may enable interpretation of a QR code or a hyperlink that contains an identifier associated with a VOIP service subscriber. With the identifier, information related to the subscriber may be accessed and entered during a signup session. Alternatively, data directly encoded into the token may be processed by the token interface module 424 and used to enter data or configuration options during a signup session.

In accordance with at least some embodiments, the client-side telephony application 410, when executed, causes the processor 402 to initiate a signup session for VOIP services on the mobile device 400. The client-side telephony application 410, when executed, also causes the processor 402 to streamline configuration of at least some of the VOIP services for the mobile device 400 during the signup session based on a VOIP services signup session token. For example, the client-side telephony application 410, when executed, may cause the processor 402 to streamline configuration of contact list features, one-touch call transfer features, and/or streamlined conferencing features for the mobile device 400 during the signup session based on the VOIP services signup session token.

In some embodiments, the client-side telephony application 410, when executed, may cause the processor 402 to extract information from a scanned printable image corresponding to the VOIP services signup session token to streamline configuration of at least some of the VOIP services. Additionally or alternatively, the client-side telephony application 410, when executed, may cause the processor 402 to extract information from a link corresponding to the VOIP services signup session token to streamline configuration of at least some of the VOIP services.

In addition to or instead of configuring features of a VOIP service, the client-side telephony application 410, when executed, may cause the processor 402 to enter signup data for a user of the mobile device 400 based on the VOIP services signup session token. The signup data may, for example, correspond to a phone number, a name, an address, an email, and a password. Further, the client-side telephony application 410, when executed, may cause the processor 402 to enter billing information for a user of the mobile device 400 based on the VOIP services signup session token. Further, the client-side telephony application 410, when executed, may cause the processor 402 to enter session initiation protocol (SIP) settings for the mobile device based on the VOIP services signup session token. Further, the client-side telephony application 410, when executed, may cause the processor 402 to enter enterprise information associated with a user of the mobile device 400 based on the VOIP services signup session token.

FIG. 5 shows a telephony server 500 in accordance with an embodiment of the disclosure. The telephony server 500 may be part of the cloud communication system cluster 102 to provide the VOIP services and server-side streamlined conferencing operations as described herein. As shown, the telephony server 500 comprises a processor 502 and a non-transitory computer-readable storage 504 that stores a server-side telephony application 510. The processor 502 also couples to a network interface 550 that enables network communications as described herein. In accordance with at least some embodiments, the server-side telephony application 510 comprises a login manager 512, a user interface manager 514, and a contact list sync manager 516. Further, the server-side telephony application 510 comprises a streamlined procurement/configuration manager 520 with a signup session manager 522 and a token provisioning manager 524.

The login manager 512 enables a user of a mobile device (e.g., mobile device 400) to log into a VOIP service corresponding to a communication session established with the cloud communication system cluster 102. The user interface manager 514 stores instructions and/or data to enable server-side operations that are compatible with user interface options available on a client-side telephony application. The streamlined streamlined procurement/configuration manager 520 supports streamlined configuration of VOIP services and/or entry of data during a signup session as described herein. The signup session manager 522 supports signup sessions for VOIP services as described herein. Meanwhile, token provisioning manager 524 supports creation and distribution unique tokens such as the VOIP services signup session tokens described herein to streamline the procurement/configuration of VOIP services.

In at least some embodiments, the server-side telephony application 510, when executed, may cause the processor 502 to initiate a signup session for VOIP services on a mobile device (e.g., mobile device 400). The server-side telephony application 510, when executed, may cause the processor 502 to configure of at least some of the VOIP services for the mobile device during the signup session based on a VOIP services signup session token. As an example, the server-side telephony application 510, when executed, may cause the processor 502 to streamline configuration of contact list features, one-touch call transfer features, and/or streamlined conferencing features of a VOIP service during a signup session based on the VOIP services signup session token.

Further, the server-side telephony application 510, when executed, may cause the processor 502 to provide a printable image (e.g., a QR code, bar code, alphanumeric identifier, etc.) as the VOIP services signup session token. Further, the server-side telephony application 510, when executed, may cause the processor 502 to provide a web hyperlink as the VOIP services signup session token.

In at least some embodiments, the server-side telephony application 510, when executed, may cause the processor 502 to streamline entry of signup data for a user of a mobile device during the signup session based on the VOIP services signup session token. The signup data may include, for example, a phone number, a name, an address, an email, and a password. The server-side telephony application 510, when executed, may cause the processor 502 to streamline entry of billing information for a user of a mobile device during the signup session based on the VOIP services signup session token. Further, the server-side telephony application 510, when executed, may cause the processor 502 to streamline entry of session initiation protocol (SIP) settings for the mobile device during the signup session based on the VOIP services signup session token. Further, the server-side telephony application 510, when executed, may cause the processor 502 to streamline entry of enterprise information associated with a user of the mobile device during the signup session based on the VOIP services signup session token.

In at least some embodiments, the server-side telephony application 510, when executed, may cause the processor 502 to store VOIP services configuration options associated with a subscription for a user of a mobile device, and transfer the subscription to a new mobile device for the user. Further, the server-side telephony application 510, when executed, may cause the processor 502 to invalidate a subscription in response to a notification that a mobile device has been lost or stolen, where invalidating the subscription causes the VOIP services to be unavailable for the mobile device.

Figure 7:
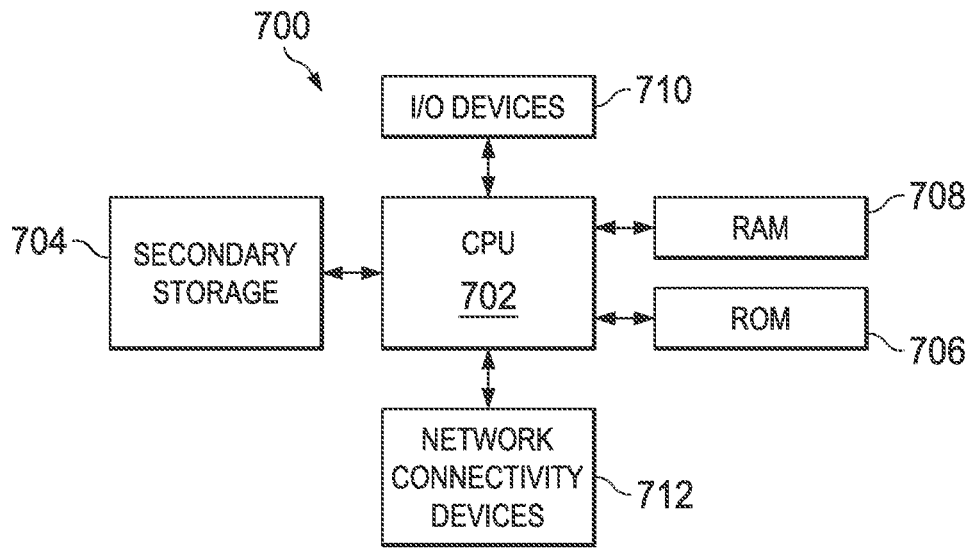
FIG. 7 shows components of a computer system in accordance with an embodiment of the disclosure.

FIG. 7 shows an example of various components of a computer system 700 in accordance with the disclosure. The computer system 700 may perform various operations to support the streamlined procurement/configuration operations described herein. The computer system 700 may correspond to components of the mobile device 122, the cloud communication system cluster 102, the devices 204 or 244 the mobile device 304, the mobile device 400, or the telephony server 500 described herein.

As shown, the computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. In the electrical engineering and software engineering arts functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. For example, a design that is still subject to frequent change may be implemented in software, because re-spinning a hardware implementation is more expensive than re-spinning a software design. Meanwhile, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 may be comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods known to one skilled in the art. The baseband signal and/or signal embodied in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the streamlined procurement/configuration functionality disclosed herein may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

In some examples, a non-transitory computer-readable storage medium may store telephony instructions that, when executed, cause the processor 702 to perform the server-side streamlined procurement/configuration operations described herein. In other examples, a non-transitory computer-readable storage medium may store telephony instructions that, when executed, cause the processor 702 to perform the client-side streamlined procurement/configuration operations described herein.

Figure 8:
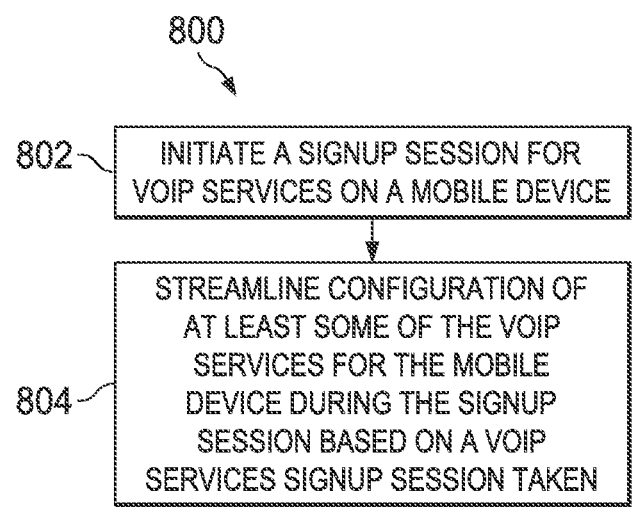
FIG. 8 shows a VOIP service signup method in accordance with an embodiment of the disclosure.

FIG. 8 shows a method 800 in accordance with an embodiment of the disclosure. The method 800 may be performed by a telephony server that is part of a cloud communication system cluster 102 as described herein. As shown, the method 800 comprises initiating a signup session for VOIP services on a mobile device (block 802). At block 804, configuration of at least some of the VOIP services for the mobile device is streamlined during the signup session based on a VOIP services signup session token.

In at least some embodiments, streamlining configuration of at least some of the VOIP services for the mobile device as in block 804 comprises configuring a one-touch call transfer feature for the mobile device during the signup session based on the VOIP services signup session token. Further, streamlining configuration of at least some of the VOIP services for the mobile device as in block 804 comprises configuring conferencing options for the mobile device during the signup session based on the VOIP services signup session token. Further, streamlining configuration of at least some of the VOIP services for the mobile device as in block 804 comprises configuring contact list options for the mobile device during the signup session based on the VOIP services signup session token.

In some embodiments, streamlining configuration of at least some of the VOIP services for the mobile device as in block 804 comprises streamlining entry of signup data for a user of the mobile device during the signup session based on the VOIP services signup session token. The signup data may comprise, for example, a phone number, a name, an address, an email, and a password. Further, streamlining configuration of at least some of the VOIP services for the mobile device as in block 804 may comprise streamlining entry of billing information for a user of the mobile device during the signup session based on the VOIP services signup session token. Further, streamlining configuration of at least some of the VOIP services for the mobile device as in block 804 may comprise streamlining entry of session initiation protocol (SIP) settings for the mobile device during the signup session based on the VOIP services signup session token. Further, streamlining configuration of at least some of the VOIP services for the mobile device as in block 804 may comprise streamlining entry of enterprise information associated with a user of the mobile device during the signup session based on the VOIP services signup session token.

In at least some embodiments, the method 800 may further comprise providing a printable image or a web hyperlink as the VOIP services signup session token. Further, the method 800 may comprise storing VOIP services configuration options associated with a subscription for a user of the mobile device, and transferring the subscription to a new mobile device for the user. Further, the method 800 may comprise invalidating the subscription in response to a notification that the mobile device has been lost or stolen, where invalidating the subscription causes the VOIP services to be unavailable for the mobile device.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:

at least one server comprising a processor to manage voice over internet protocol (VOIP) services, wherein the managed VOIP services provided by the at least one server comprise a procurement service configured to streamline configuration of at least some of the VOIP services for a mobile device during a new user signup session based on a VOIP services signup session token, the procurement service comprising:

a signup controller configured to manage the new user signup session, wherein the new user signup session is to create a new account, via which the mobile device is provided access to the VOIP services, for the mobile device, wherein no account for the mobile device exists prior to the new user signup session; and a token provisioner configured to:

generate the VOIP services signup session token, wherein the VOIP services signup session token is encoded with information to be entered during creation of the new account, the information comprising configuration options and user information to be entered as part of creation of the new account; and provide the VOIP services signup session token to the signup controller;

wherein the signup controller is configured to streamline entry of signup information for the new account by entering, as part of creation of the new account, user information and configuration options provided via the VOIP services signup session token, and wherein the user information and configuration options are stored, prior to initiation of the new user signup session, in a records database accessible to the signup controller and the token provisioner, and the user information and configuration options are related to transactions that have been completed and transactions that have not been completed for accounts other than the new account; wherein the configuration options comprise a list of codecs and quality of service settings to be applied by the mobile device to calls via the VOIP services, and session initiation protocol forking options to be applied by the at least one server;

one or more VOIP applications executable by the mobile device:

wherein at least one of the VOIP applications comprises a management interface configured to determine which of the VOIP applications will be executed based on the mobile device being registered with multiple communication systems;

wherein at least one of the VOIP applications is configured to:

display a plurality screens for entry of parameters as part of creation of the new account; and determine which of the screens to display based on the user information and configuration options encoded in the signup session token;

omit display of some or all of the screens based on the parameters to be entered via the screens being encoded in the signup session token.

2. The system of claim 1, wherein the procurement service is configured to streamline configuration of a one-touch call transfer feature for the mobile device during the signup session based on the VOIP services signup session token.

3. The system of claim 1, wherein the procurement service is configured to streamline configuration of conferencing options for the mobile device during the signup session based on the VOIP services signup session token.

4. The system of claim 1, wherein the procurement service is configured to streamline configuration of contact list options for the mobile device during the signup session based on the VOIP services signup session token.

5. The system of claim 1, wherein the procurement service is configured to provide a printable image as the VOIP services signup session token.

6. The system of claim 1, wherein the procurement service is configured to provide a web hyperlink as the VOIP services signup session token.

7. The system of claim 1, wherein the procurement service is configured to streamline entry of signup data for a user of the mobile device during the signup session based on the VOIP services signup session token, and wherein the signup data comprises a phone number, a name, an address, an email, and a password.

8. The system of claim 1, wherein the procurement service is configured to streamline entry of billing information for a user of the mobile device during the signup session based on the VOIP services signup session token.

9. The system of claim 1, wherein the procurement service is configured to streamline entry of session initiation protocol (SIP) settings for the mobile device during the signup session based on the VOIP services signup session token.

10. The system of claim 1, wherein the procurement service is configured to streamline entry of enterprise information associated with a user of the mobile device during the signup session based on the VOIP services signup session token.

11. The system of claim 1, further comprising a database in communication with the at least one server, wherein the database stores VOIP services configuration options associated with a subscription for a user of the mobile device, wherein the procurement service is configured to transfer the subscription to a new mobile device for the user.

12. The system of claim 11, wherein the subscription is invalidated in response to a notification that the mobile device has been lost or stolen, and wherein invalidation of the subscription causes the managed VOIP services provided by the at least one server to be unavailable for the mobile device.

13. A method, comprising:
    initiating, by a processor, via a server-based signup controller, a new user signup session for VOIP services on a mobile device; and
    creating, by the signup controller via the new user signup session, a new account, via which the mobile device is provided access to the VOIP services, for the mobile device, wherein no account for the mobile device exists prior to the new user signup session;
    generating, by the processor, via a server-based token provisioner, a VOIP services signup session token, wherein the generating comprises encoding the VOIP services signup session token with user information and configuration options to be entered during creation of the new account;
    providing, by the token provisioner, the VOIP services signup session token to the signup controller; and
    entering, by the signup controller, as part of the creation of the new account, the user information and the configuration options provided via the VOIP services signup session token to streamline configuration of at least some of the VOIP services for the mobile device during the signup session, and wherein the user information and the configuration options are stored, prior to initiation of the new user signup session, in a records database accessible to the signup controller and the token provisioner, and the user information and configuration options are related to transactions that have been completed and transactions that have not been completed for accounts other than the new account; wherein the configuration options comprise a list of codecs and quality of service settings to be applied by the mobile device to calls via the VOIP services, and session initiation protocol forking options to be applied by the at least one server;
    determining, by the mobile device, which of a plurality of VOIP applications stored on the mobile device will be executed based on the mobile device being registered with multiple communication systems;
    determining, by the mobile device, which of a plurality of parameter entry screens that are displayable by the mobile device for entry of parameters as part of the creation of the new account, to display based on the user information and configuration options encoded in the signup session token; and
    omitting display of some or all of the screens based on the parameters to be entered via the screens being encoded in the signup session token.

14. The method of claim 13, wherein streamlining configuration of at least some of the VOIP services for the mobile device comprises configuring a one-touch call transfer feature for the mobile device during the signup session based on the VOIP services signup session token.

15. The method of claim 13, wherein streamlining configuration of at least some of the VOIP services for the mobile device comprises configuring conferencing options for the mobile device during the signup session based on the VOIP services signup session token.

16. The method of claim 13, wherein streamlining configuration of at least some of the VOIP services for the mobile device comprises configuring contact list options for the mobile device during the signup session based on the VOIP services signup session token.

17. The method of claim 13, further comprising providing a printable image as the VOIP services signup session token.

18. The method of claim 13, further comprising providing a web hyperlink as the VOIP services signup session token.

19. The method of claim 13, wherein streamlining configuration of at least some of the VOIP services for the mobile device comprises streamlining entry of signup data for a user of the mobile device during the signup session based on the VOIP services signup session token, and wherein the signup data comprises a phone number, a name, an address, an email, and a password.

20. The method of claim 13, wherein streamlining configuration of at least some of the VOIP services for the mobile device comprises streamlining entry of billing information for a user of the mobile device during the signup session based on the VOIP services signup session token.

21. The method of claim 13, wherein streamlining configuration of at least some of the VOIP services for the mobile device comprises streamlining entry of session initiation protocol (SIP) settings for the mobile device during the signup session based on the VOIP services signup session token.

22. The method of claim 13, wherein streamlining configuration of at least some of the VOIP services for the mobile device comprises streamlining entry of enterprise information associated with a user of the mobile device during the signup session based on the VOIP services signup session token.

23. The method of claim 13, further comprising storing VOIP services configuration options associated with a subscription for a user of the mobile device, and transferring the subscription to a new mobile device for the user.

24. The method of claim 23, further comprising invalidating the subscription in response to a notification that the mobile device has been lost or stolen, wherein said invalidating the subscription causes the VOIP services to be unavailable for the mobile device.

25. A mobile device, comprising:
a processor;
a non-transitory computer-readable medium storing a telephony application, wherein the telephony application, when executed, causes the processor to:
initiate a new user signup session for VOIP services on the mobile device, and to streamline configuration of at least some of the VOIP services for the mobile device during the signup session based on a VOIP services signup session token;
wherein the new user signup session is to create a new account, via which the mobile device is provided access to the VOIP services, for the mobile device, wherein no account for the mobile device exists prior to the new user signup session;
wherein the VOIP services signup session token is encoded with information to be entered via the mobile communication device during creation of the new account, the information comprising configuration options and user information to be entered as part of creation of the new account, wherein the user information and configuration options are related to transactions that have been completed and transactions that have not been completed for accounts other than the new account;
wherein the configuration options comprise a list of codecs and quality of service settings to be applied by the mobile communication device to calls via the VOIP services;
display a signup session menu comprising a plurality of screens for entry of information by a user of the device during the new user signup session;
determine which of the screens to display based on the user information and configuration options encoded in the VOIP services signup session token;
omit display of some or all of the screens based on the information to be entered via the screens being encoded in the VOIP services signup session token; and
determine which of a plurality of VOIP applications stored in the mobile communication device will be executed based on the mobile communication device being registered with multiple communication systems.

26. The mobile communication device of claim 25, wherein the telephony application, when executed, causes the processor to streamline configuration of a one-touch call transfer feature for the mobile device during the signup session based on the VOIP services signup session token.

27. The mobile communication device of claim 25, wherein the telephony application, when executed, causes the processor to streamline configuration of conferencing options for the mobile device during the signup session based on the VOIP services signup session token.

28. The mobile communication device of claim 25, wherein the telephony application, when executed, causes the processor to streamline configuration of contact list options for the mobile device during the signup session based on the VOIP services signup session token.

29. The mobile communication device of claim 25, wherein the telephony application, when executed, causes the processor to extract information from a scanned printable image corresponding to the VOIP services signup session token to streamline configuration of at least some of the VOIP services.

30. The mobile communication device of claim 25, wherein the telephony application, when executed, causes the processor to extract information from a link corresponding to the VOIP services signup session token to streamline configuration of at least some of the VOIP services.

31. The mobile communication device of claim 25, wherein the telephony application, when executed, causes the processor to enter signup data for a user of the mobile device based on the VOIP services signup session token, and wherein the signup data comprises a phone number, a name, an address, an email, and a password.

32. The mobile communication device of claim 25, wherein the telephony application, when executed, causes the processor to enter billing information for a user of the mobile device based on the VOIP services signup session token.

33. The mobile communication device of claim 25, wherein the telephony application, when executed, causes the processor to enter session initiation protocol (SIP) settings for the mobile device based on the VOIP services signup session token.

34. The mobile communication device of claim 25, wherein the telephony application, when executed, causes the processor to enter enterprise information associated with a user of the mobile device based on the VOIP services signup session token.

* * * * *